(12) United States Patent
Hemmi et al.

(10) Patent No.: US 8,417,898 B2
(45) Date of Patent: Apr. 9, 2013

(54) STORAGE CONTROL APPARATUS AND STORAGE CONTROL APPARATUS CONTROL METHOD

(75) Inventors: Masateru Hemmi, Odawara (JP); Atsushi Yasuno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/989,425

(22) PCT Filed: Oct. 7, 2010

(86) PCT No.: PCT/JP2010/006015
§ 371 (c)(1),
(2), (4) Date: Oct. 25, 2010

(87) PCT Pub. No.: WO2012/046278
PCT Pub. Date: Apr. 12, 2012

(65) Prior Publication Data
US 2012/0089788 A1    Apr. 12, 2012

(51) Int. Cl.
*G06F 12/00* (2006.01)

(52) U.S. Cl. .......... 711/148; 711/111; 711/156; 710/52; 710/105; 710/315

(58) Field of Classification Search .................. 711/149, 711/111, 148, 156; 710/52, 105, 315
See application file for complete search history.

(56) References Cited

U.S. PATENT DOCUMENTS

| 6,542,961 B1 * | 4/2003 | Matsunami et al. .......... 711/114 |
| 7,558,264 B1 | 7/2009 | Lolayekar et al. |
| 2006/0013251 A1 | 1/2006 | Hufferd |
| 2009/0254507 A1 | 10/2009 | Hosoya et al. |

FOREIGN PATENT DOCUMENTS

| EP | 1 538 528 A1 | 6/2005 |
| EP | 2 136 285 A2 | 12/2009 |
| JP | 2009-251725 A | 10/2009 |

\* cited by examiner

*Primary Examiner* — Kalpit Parikh
(74) *Attorney, Agent, or Firm* — Mattingly & Malur, PC

(57) ABSTRACT

A protocol chip and a communication conversion circuit are provided in a channel adapter package that is in charge of communications with a host. The communication conversion circuit communicates with the protocol chip using a procedure that conforms to a communication protocol. The communication conversion circuit communicates with a microprocessor using a procedure that is common to multiple communication protocols. It appears from the microprocessor as though communications are being carried out with the same type of channel adapter package.

9 Claims, 25 Drawing Sheets

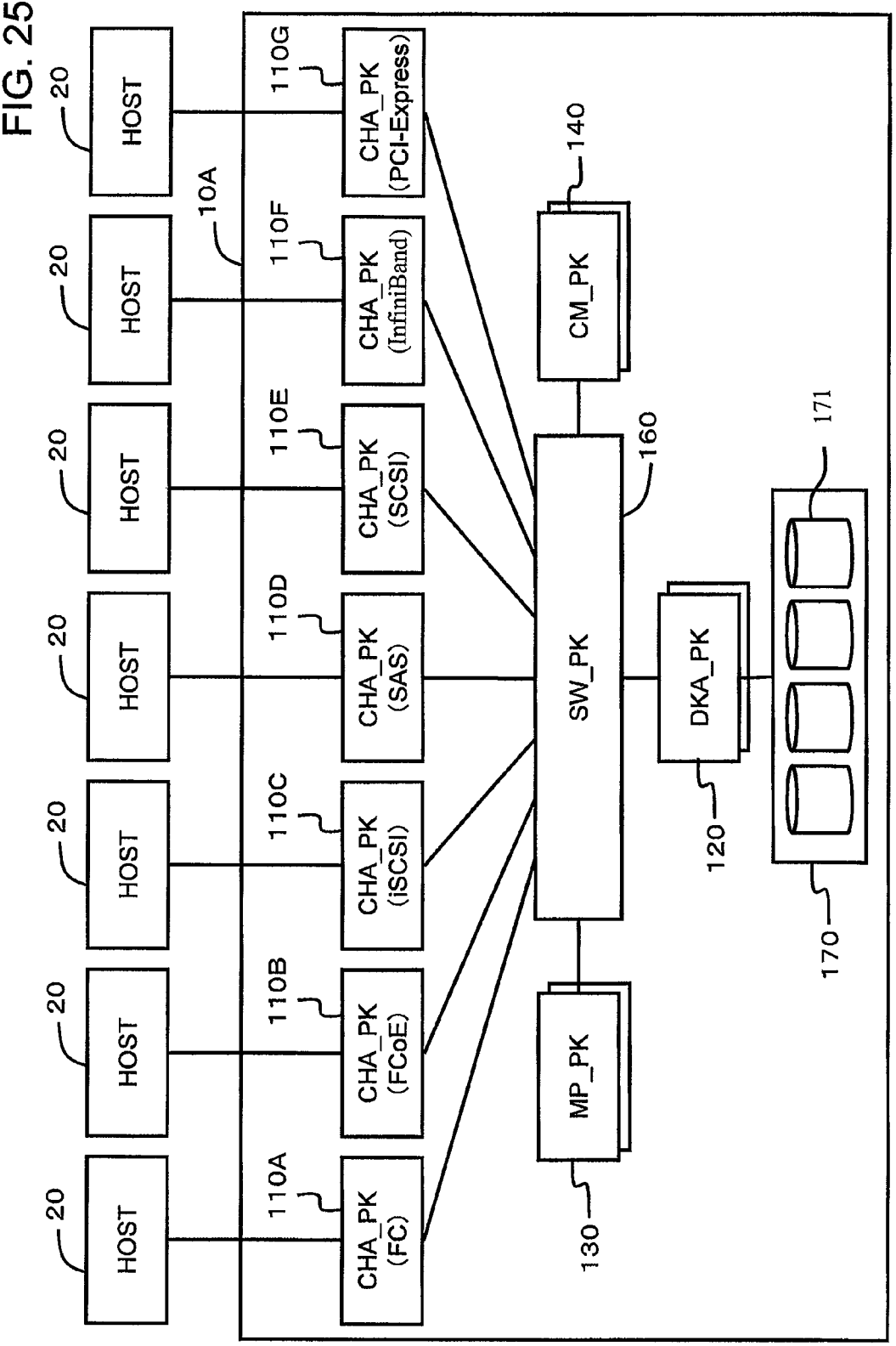

STORAGE CONTROL APPARATUS AND STORAGE CONTROL APPARATUS CONTROL METHOD

TECHNICAL FIELD

The present invention relates to a storage control apparatus and a storage control apparatus control method.

BACKGROUND ART

A storage control apparatus receives and processes a command from a host computer, and inputs/outputs data to/from a storage apparatus. The storage control apparatus comprises a front-end package for each of multiple types of communication protocols. The front-end package is a communication circuit for communicating with the host computer based on the communication protocol.

A command that is received by the front-end package is sent from the front-end package to a microprocessor package. A microprocessor inside the microprocessor package processes this command and sends the result of the processing to the front-end package (Patent Literature 1).

CITATION LIST

Patent Literature

[PTL (Patent Literature) 1]
Japanese Patent Application Laid-open Publication No. 2009-251725

SUMMARY OF INVENTION

Technical Problem

In the prior art, it is possible to support multiple types of communication protocols. However, a control scheme and/or an interface of the front-end package differ for each communication protocol. Therefore, the front-end package must incorporate a driver program corresponding to the communication protocol. In addition, to communicate with the respective front-end packages, it is necessary to provide each microprocessor package with interfaces that accord with the respective front-end package types.

In a case where multiple microprocessor packages are correspondingly used with each of the front-end packages, an interface must be provided in the respective microprocessor packages for each front-and package.

Communication protocols are improved on a yearly basis, and the types of these protocols are increasing. Therefore, in order to support a new communication protocol, a new front-end package and microprocessor package must be developed and tested.

Consequently, an object of the present invention is to provide a storage control apparatus and a storage control apparatus control method designed to enable a microprocessor part to easily support multiple protocol control parts with different communication protocols, and to make it possible to reduce the number of development processes by disposing a communication conversion part between the protocol control part and the microprocessor part. Other objects of the present invention should become clear from the descriptions of the examples explained below.

Solution to Problem

A storage control apparatus according to one aspect of the present invention for solving the above-mentioned problem comprises at least one first communication control part for communicating with a host apparatus, at least one storage apparatus for storing data to be used by the host apparatus, at least one second communication control part for communicating with the storage apparatus, and at least one microprocessor part, which comprises at least one microprocessor for processing a command received from the host apparatus via the first communication control part and sending a result of this processing to the host apparatus via the first communication control part. The first communication control part comprises at least one host coupling part which is coupled to the host apparatus, a protocol control part which is coupled to the host coupling part and is used for carrying out communications with the host apparatus in accordance with a predetermined communication protocol, and a communication conversion part, which is coupled to the protocol control part and the microprocessor part, and which communicates with the protocol control part based on a procedure that corresponds to the type of the protocol control part, and communicates with the microprocessor part based on a common procedure regardless of the type of the protocol control part.

The first communication control part may comprise multiple first communication control parts that use respectively different predetermined communication protocols, and the host apparatus may comprise multiple host apparatuses that use the respective predetermined communication protocols. The communication conversion parts of the first communication control parts are able to respectively communicate with the corresponding host apparatuses in accordance with respectively different predetermined communication protocols, and, the communication conversion parts of the first communication control parts are able to respectively communicate with the microprocessor part in accordance with the same common procedure.

The present invention can be understood as a control method of a storage control apparatus. In addition, at least a portion of the present invention is able to be configured as a computer program. This computer program is capable of being distributed via either a recording medium or a communication medium. Furthermore, the scope of the present invention includes other combinations besides the combinations of the above-mentioned aspect.

BRIEF DESCRIPTION OF DRAWINGS

FIG. 25 is a diagram of an entire computer system related to a second example.

DESCRIPTION OF EMBODIMENTS

Aspects of the embodiments of the present invention will be explained below based on the drawings. The present invention, as will be explained hereinbelow, provides a communication conversion circuit between a protocol chip that is prepared for each communication protocol and the respective microprocessors. The communication conversion circuit absorbs the differences of the procedures, which differ for each communication protocol, thereby reducing the number of development processes of the protocol chip. In addition, since the communication conversion circuit provides a common interface for the respective protocol chips with different communication protocols, each microprocessor is able to communicate with the respective different types of protocol chips in accordance with the common interface. This reduces the number of development processes for the microprocessor as well. In addition, since the microprocessor communicates with the protocol chip via the communication conversion circuit, command processing can be completed faster than in a case where the microprocessor communicates directly with the protocol chip, making it possible to reduce the load on the microprocessor, since the communication conversion circuit substitutes "Consumer index Up".

The communication conversion circuit conceals the differences between a channel adapter package based on one communication protocol (for example, an FC protocol) and a channel adapter package based on another communication protocol (for example, an FCoE protocol) from the microprocessor. The communication conversion circuit of each channel adapter package, for example, communicates with the respective microprocessors in accordance with procedures of the one communication protocol. Therefore, the channel adapter package based on the other communication protocol is able to behave with respect to each microprocessor just like it is the channel adapter package based on the one communication protocol. In accordance with this, the procedures based on the one communication protocol are equivalent to "common procedures".

Furthermore, the descriptions of the examples given hereinbelow do not limit the scope of the present invention. Not all of the characteristic combinations explained using the examples are required as solutions of the invention.

Example 1

Figure 1:
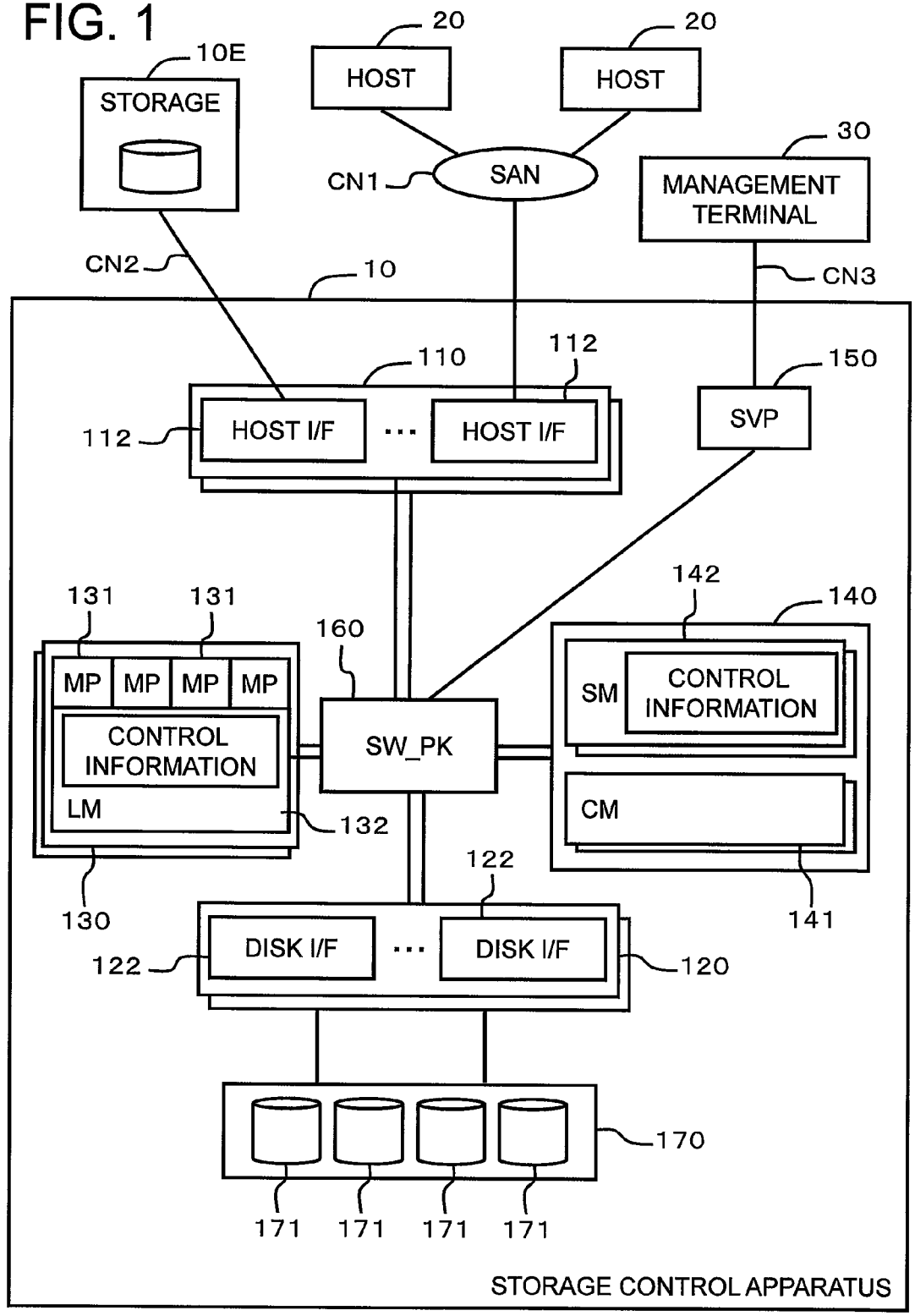
FIG. 1 is a diagram of an entire computer system comprising a storage control apparatus.

FIG. 1 shows a computer system comprising a storage control apparatus 10 related to a first example. In the following explanation, an interface will be abbreviated as "I/F", a microprocessor will be abbreviated as "MP", and a switch will be abbreviated as "SW", respectively.

The computer system, for example, comprises at least one storage control apparatus 10, and at least one host computer (hereinafter, host) 20. The computer system can also comprise at least one management terminal 30. In addition, the computer system may also comprise at least one other storage control apparatus 10E.

The configuration of a communication network will be explained first. The storage control apparatus 10 and respective hosts 20 are coupled so as to enable two-way communications via a first communication network CN1. The other storage control apparatus 10E and the storage control apparatus 10 are coupled so as to enable two-way communications via a second communication network CN2. The management terminal 30 and the storage control apparatus 10 are coupled so as to enable two-way communications via a third communication network CN3.

The first communication network CN1 and the second communication network CN2, for example, are configured as either an FC-SAN (Fibre Channel-Storage Area Network) or an IP-SAN (Internet Protocol-Storage Area Network). The third communication network CN3, for example, is configured as a LAN (Local Area Network).

Furthermore, in FIG. 1, multiple independent communication networks CN1, CN2, and CN3 are shown being used, but, for example, CN1 and CN2 may be configured as the same communication network, or CN1, CN2 and CN3 may be configured as the same communication network.

In addition, although omitted from FIG. 1, a management server for managing the computer system may be provided, and the management server may be coupled with the respective storage control apparatuses 10 and 10E and the respective hosts 20 using a communication network for management use.

Each host 20, for example, can be configured as a so-called open system server computer. Each host 20, for example, comprises a communication interface circuit for communicating with the storage control apparatus 10 based on a communication protocol such as FC, FCoE, iSCSI (internet Small Computer System Interface), SCSI (Small Computer System Interface), SAS (Serial Attached SCSI), InfiniBand, or PCI-Express.

Each host 20, for example, comprises application programs, such as a customer management program, a graphics delivery program, and an electronic mail management program. An application program uses the communication interface circuit of the host 20 to access a logical volume in the storage control apparatus 10 and read/write data.

The other storage control apparatus 10E is used by the storage control apparatus 10. The storage control apparatus 10 presents a logical volume of the other storage control apparatus 10E to the host 20 as a logical volume that is inside the storage control apparatus 10.

The other storage control apparatus 10E will be called the external storage control apparatus 10E since it is a storage control apparatus that exists outside of the storage control apparatus 10. A logical volume of the external storage control apparatus 10E will be called an external volume. The storage control apparatus 10 comprises a virtual logical volume corresponding to the external volume. Since this virtual logical volume is coupled to the external volume, it will be called the externally coupled volume.

When the host 20 accesses the externally coupled volume, a command from the host 20 is converted to a command with respect to the external volume in the external storage control apparatus 10E, and is transferred from the storage control apparatus 10 to the external storage control apparatus 10E. The storage control apparatus 10, upon receiving a command processing result from the external storage control apparatus 10E, sends this processing result to the host 20. Therefore, from the host's 20 perspective, the access-destination logical volume appears to be located inside the storage control apparatus 10. In addition, the virtual externally coupled volume is able to make use of various types of functions (a cache management function and so forth) of the storage control apparatus 10.

The management terminal 30, for example, is configured as a computer, such as a node-type personal computer, a tablet-type personal computer, a handheld computer, a personal digital assistant, or a mobile phone. The user, who is the administrator of the computer system, is able to acquire information related to the storage control apparatus 10, or change the configuration of the storage control apparatus 10 via the management terminal 30.

The configuration of the storage control apparatus 10 will be explained. The storage control apparatus 10, for example, comprises multiple channel adapter packages 110, multiple disk adapter packages 120, multiple microprocessor packages 130, multiple cache memory packages 140, a service processor (SVP in the drawing) 150, a switch package 160, and a disk loader 170.

The channel adapter package 110 corresponds to the "first communication control part". The channel adapter package 110 is a control circuit that is in charge of communications with the host 20. Each channel adapter package 110 comprises multiple host interfaces 112. The channel adapter package 110 will be explained in detail further below.

The disk adapter package 120 corresponds to the "second communication control part". The disk adapter package 120 is a control circuit that is in charge of communications with respective storage apparatuses 171. Each disk adapter package 120 comprises multiple disk interfaces 122. The disk adapter package 120 will be explained in detail further below.

The microprocessor package 130 corresponds to the "microprocessor part". The microprocessor package 130 is in charge of command processing and the like. Each microprocessor package 130 comprises multiple microprocessors 131 and one local memory (LM in the drawing) 132. The microprocessor package 130 will be explained in detail further below.

Each cache memory package 140 is a circuit for storing data. The cache memory 140, for example, comprises a cache memory 141 and a shared memory 142. The cache memory 141, for example, stores write data received from the host 20 and read data read from the storage device 171. The shared memory 142, for example, stores management information for managing the configuration of the storage control apparatus 10, and control information for controlling the operation of the storage control apparatus 10. In addition, the cache memory package 140 can also comprise a battery and a nonvolatile memory for saving the data of the cache memory 141.

The service processor 150 collects the information inside the storage control apparatus 10, sends same to the management terminal 30, and sends an instruction inputted from the management terminal 30 to the microprocessor package 130.

The switch package 160 couples the respective channel adapter packages 110, the respective disk adapter packages 120, the respective microprocessor packages 130, the respective cache memory packages 140 and the service processor 150.

The disk loader 170 loads multiple storage devices 171. As a storage device 171, for example, it is possible to use various types of nonvolatile storage devices that are capable of reading and writing data, such as a hard disk device, a semiconductor device, an optical disk device, and a magneto-optical disk device.

In a case where a hard disk device is used as the storage device, for example, an FC (Fibre Channel) disk, a SCSI (Small Computer System Interface) disk, a SATA disk, an ATA (AT Attachment) disk, and a SAS (Serial Attached SCSI) disk can be used.

In addition, for example, various storage devices such as a flash memory, a FeRAM (Ferroelectric Random Access Memory), a MRAM (Magnetoresistive Random Access Memory), an Ovonic Unified Memory, and a RRAM (Resistance RAM) may also be used. The configuration may also be such that different types of storage devices, like a flash memory device and a hard disk drive, for example, may be intermixed inside the storage control apparatus 10.

Figure 2:
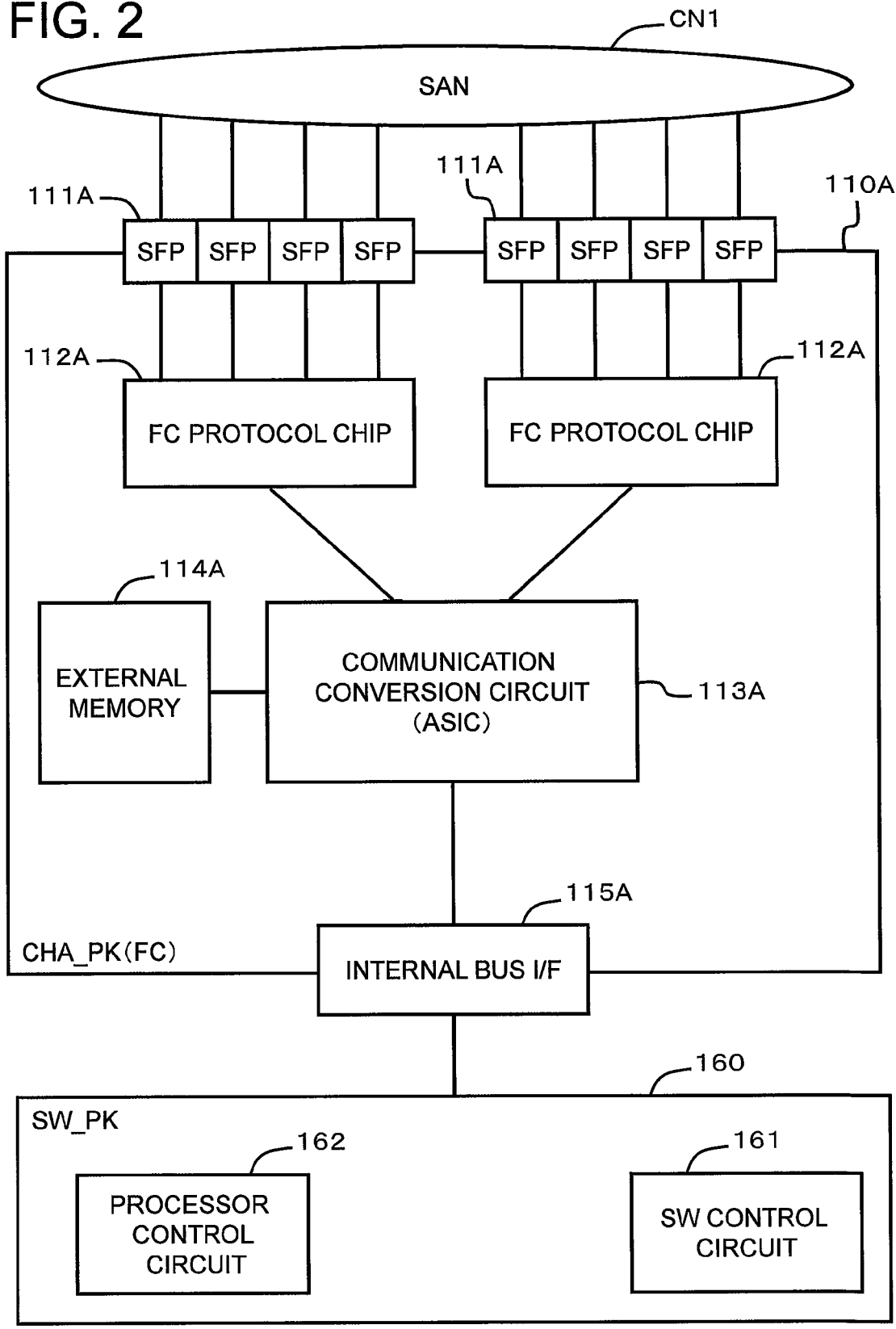
FIG. 2 is a block diagram of a channel adapter package and a switch package corresponding to an FC (Fibre Channel) protocol.

FIG. 2 shows the configuration of a channel adapter package 110A corresponding to the FC protocol (hereinafter, the FC protocol may be abbreviated as FC).

The FC-compatible channel adapter package 110A, for example, comprises multiple host coupling parts 111A, multiple protocol chips 112A, at least one control circuit 113A, at least one external memory 114A, and at least one internal bus interface 115A.

The host coupling 111A is a communication port that is coupled to the host 20 via an I/O (Input/Output) communication network CN1. SFP in the drawing is the abbreviation for Small Form Factor Pluggable.

The protocol chip 112A is a control circuit for controlling communications based on the FC protocol. The protocol chip 112A corresponds to either the "protocol control part" or a "protocol control circuit". The protocol chip 112A is in charge of the assembly and disassembly of an FC frame. A case in which two protocol chips 112A are provided in the channel adapter package 110A, and, in addition, each protocol chip 112A comprises four host coupling parts 111A each will be explained.

The communication conversion circuit 113A, for example, is configured from an ASIC (Application Specific Integrated Circuit) and a coprocessor. In the drawing, the control circuit may be displayed as ASIC for the sake of convenience. The communication control circuit 113A exchanges information and an instruction with the FC protocol chip 112A using a procedure that conforms to the FC protocol chip. In addition, the communication conversion circuit 113A exchanges information and an instruction with the microprocessor 131 in accordance with a common procedure that does not rely on the type of the protocol chip. The communication conversion circuit 113A mediates between the FC protocol 112A and the microprocessor 131 like this.

The external memory 114A is used by the communication conversion circuit 113A. The communication conversion circuit 113A comprises an internal memory (the internal memory 116A of FIG. 9). The external memory 114A stores information that differs from the information stored in the internal memory.

The communication control circuit 113A of this example is created in accordance with the FC protocol. The external memory 114A stores a queue required for supporting another communication protocol (for example, FCoE) besides the FC protocol. In this example, the communication conversion circuit 113A is created like this in accordance with the most frequently used FC, and the external memory 114A is used to support the other communication protocol. Therefore, it is possible to reduce the manufacturing costs of the communication conversion circuit 113A. Furthermore, the configuration may be such that the external memory 114A is done away with.

The internal bus interface 115A is a communication interface for coupling to the switch package 160.

The switch package 160 is shown at the bottom of FIG. 2. The switch package 160, for example, comprises a switch control circuit 161 and a processor control circuit 162. The switch package 160 is for switch-coupling the respective packages 110, 120, 130 and 140. The switch control circuit 161 switches the internal bus. The processor control circuit 162 couples the microprocessor 131 to the switch.

Figure 3:
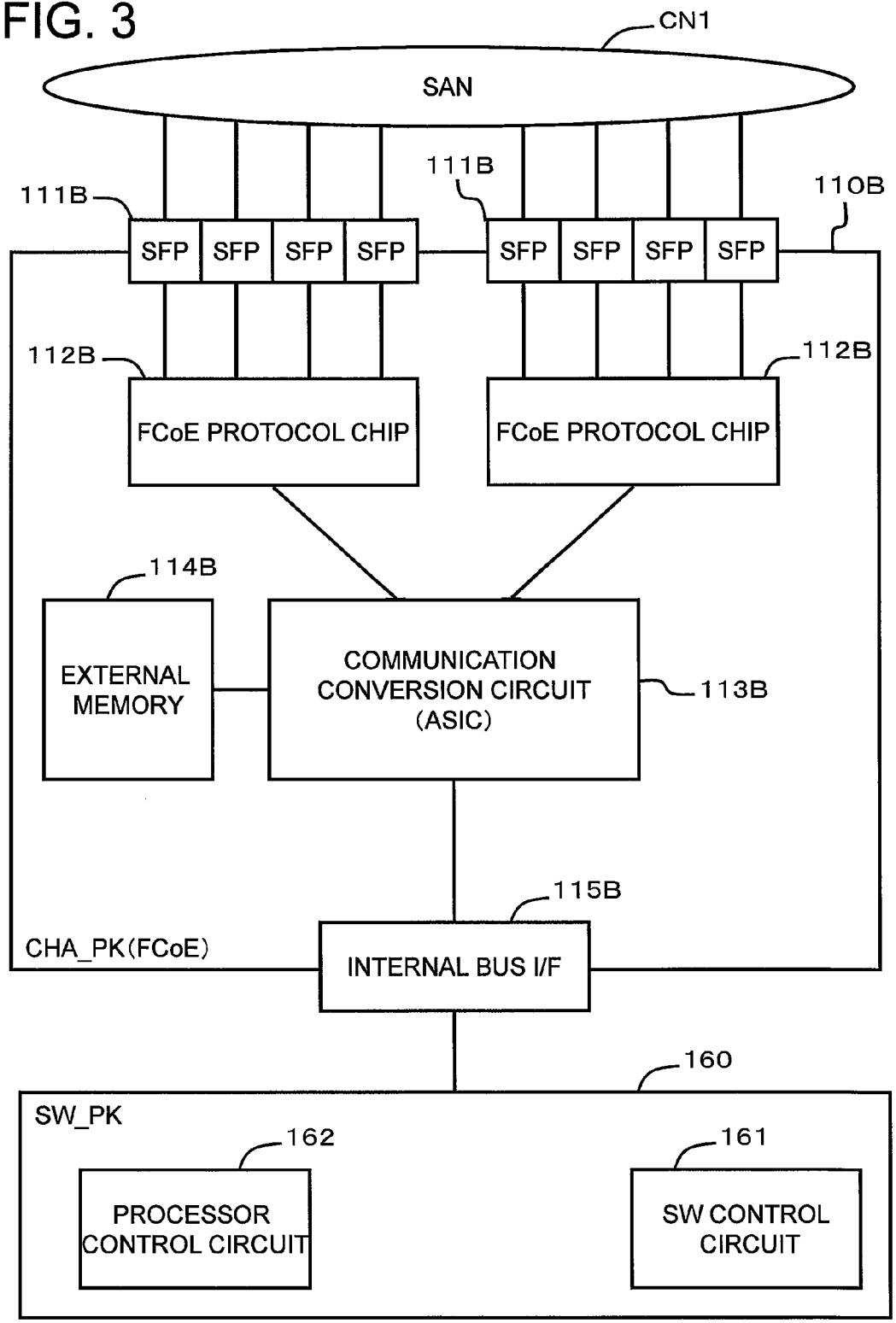
FIG. 3 is a block diagram of a channel adapter package corresponding to an FCoE (Fibre Channel over Ethernet) protocol.

FIG. 3 shows the configuration of a channel adapter package 110B corresponding to the FCoE protocol (hereinafter, may be abbreviated as FCoE). Furthermore, in a case where no particular distinction is made between the FC-compatible channel adapter package 110A and the FCoE-compatible channel adapter package 110B, this package will be called the channel adapter package 110.

The FCoE-compatible channel adapter package 110B comprises multiple host connectors 111B, multiple protocol chips 112B, at least one communication conversion circuit 113B, at least one external memory 114B, and at least one internal bus interface 115B the same as the FC-compatible channel adapter package 110A.

As described hereinabove, the host coupler 111B is a communication port that is coupled to the host 20 via the I/O communication network CN1.

The protocol chip 112B is a control circuit for controlling communications based on the FCoE protocol. The protocol chip 112B is in charge of the assembly and disassembly of an FCoE frame.

The communication conversion circuit 113B exchanges information and an instruction with the FCoE protocol chip 112A using a procedure that conforms to the FCoE protocol chip. The communication conversion circuit 113A exchanges information and an instruction with the microprocessor 131 in accordance with a common procedure that does not rely on a type of protocol chip. The communication conversion circuit 113B mediates between the FCoE protocol 112B and the microprocessor 131. The communication conversion circuit 113B uses the external memory 114B as needed.

Figure 4:
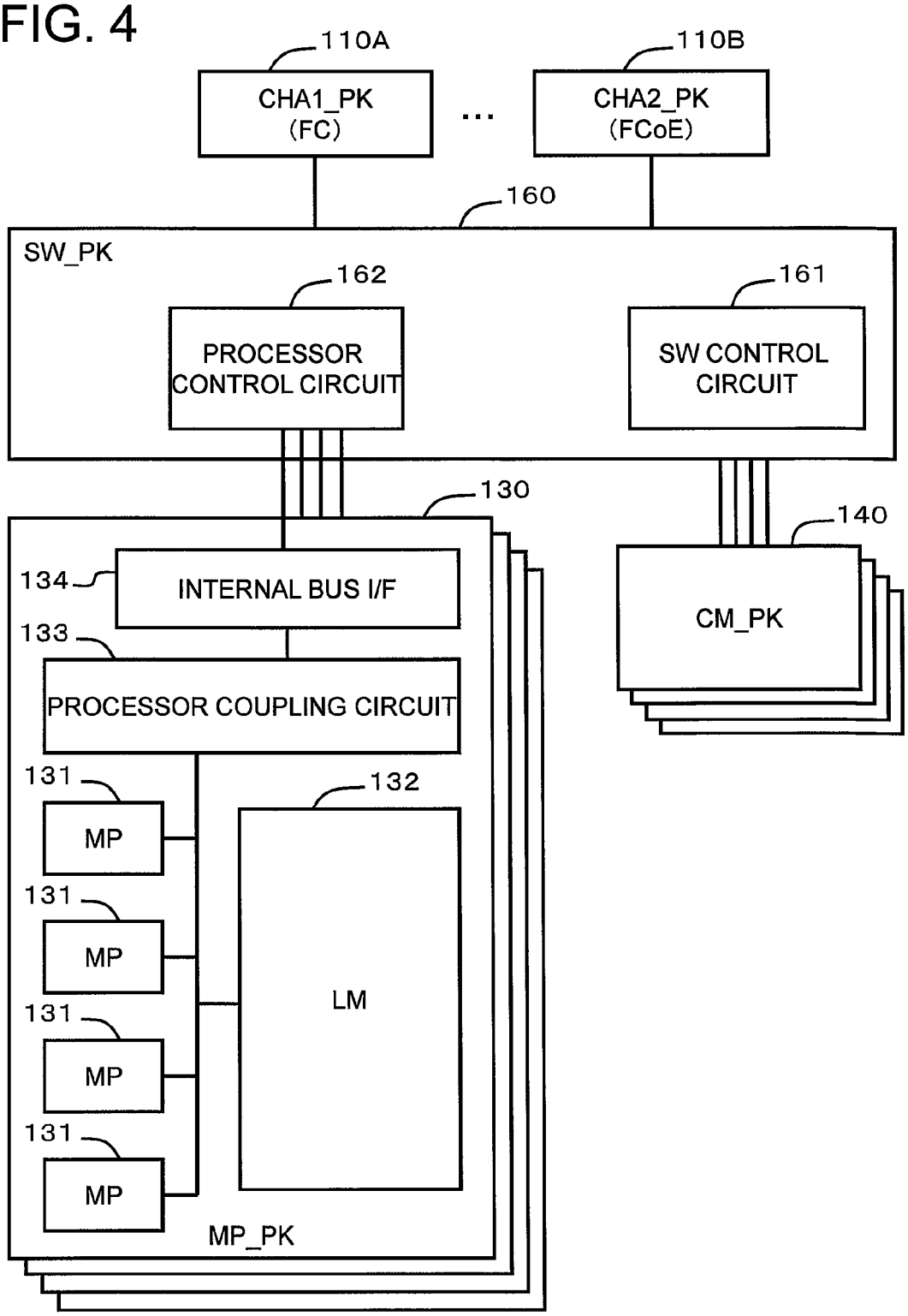
FIG. 4 is a block diagram of a microprocessor package.

FIG. 4 shows the configuration of the microprocessor package 130. The microprocessor package 130, for example, comprises multiple microprocessors 131, at least one local memory 132, at least one processor coupling circuit 133, and at least one internal bus interface 134. In this example, an explanation will be given using an example of a case in which eight microprocessor packages 130 are provided, and each microprocessor package 130 comprises four microprocessors 131.

The microprocessor 131 processes a command that has been issued from the host 20 by reading and executing a program stored in the local memory 132. The command processing result is sent to the host 20 via the channel adapter package 110.

The processor coupling circuit 133 couples a microprocessor 131 selected from among the microprocessors 131 to the channel adapter package 110 via the internal bus interface 134.

Figure 5:
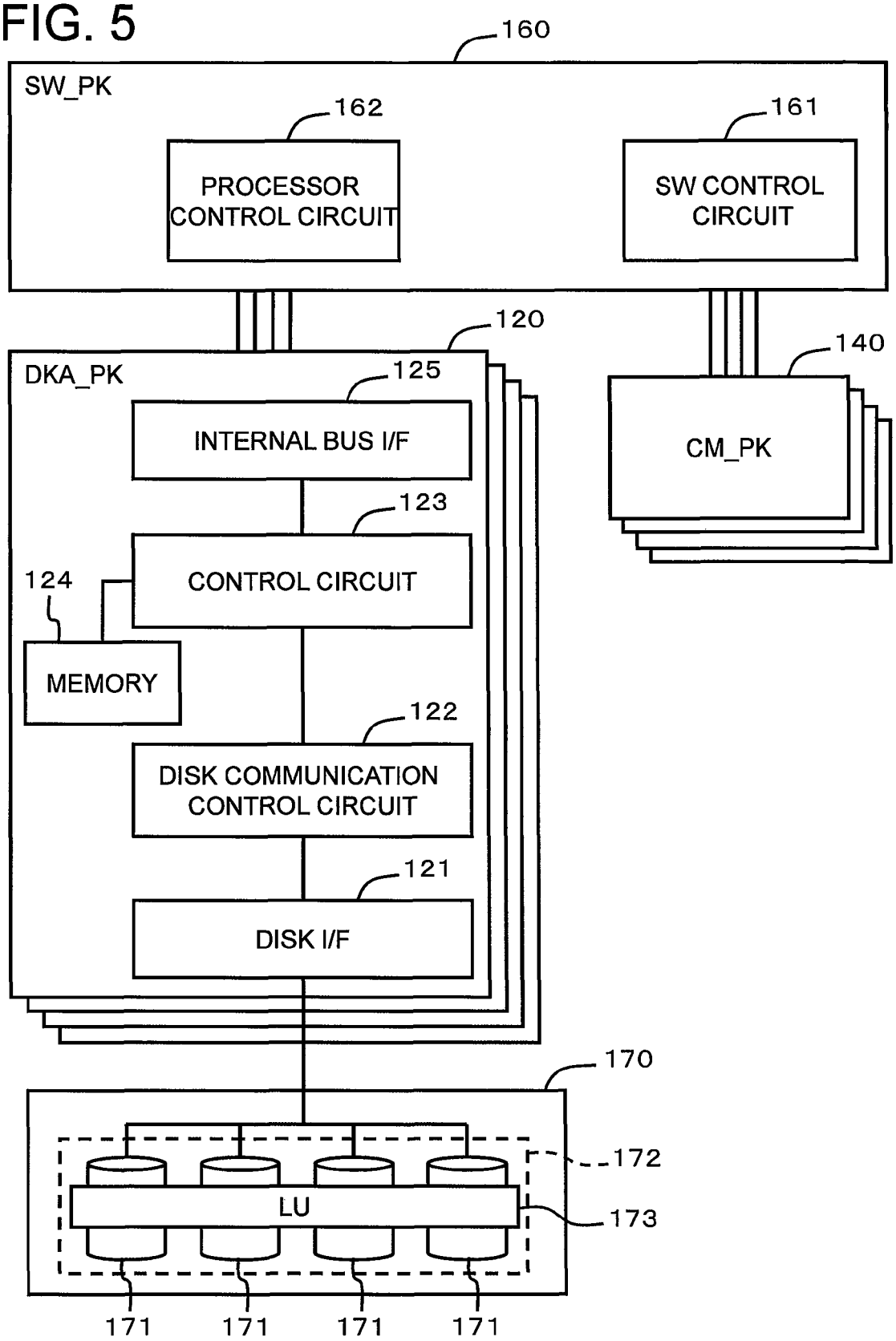
FIG. 5 is a block diagram of a disk adapter package and a disk loader.

FIG. 5 shows the configuration of the disk adapter package 120. The disk adapter package 120, for example, comprises a disk interface 121, a disk communication control circuit 122, a control circuit 123, a memory 124, and an internal bus interface 125.

The disk interface 121 is a communication port for communicating with the respective storage devices 171. The disk communication control circuit 122 is for controlling communications with a storage device 171. The control circuit 123 is for controlling the operation of the disk adapter package 120. The memory 124 is used by the control circuit 123. The control circuit 123 is coupled to the switch package 160 via the internal bus interface 125.

The disk loader 170 is shown at the bottom of FIG. 5. The disk loader 170 is able to collect the physical storage areas of multiple storage devices 171 together into a single RAID (Redundant Arrays of Independent Disks) group 172. The disk loader 170 is able to use this group of physical storage areas to provide either one or multiple logical volumes 173, which are logical storage areas.

Figure 6:
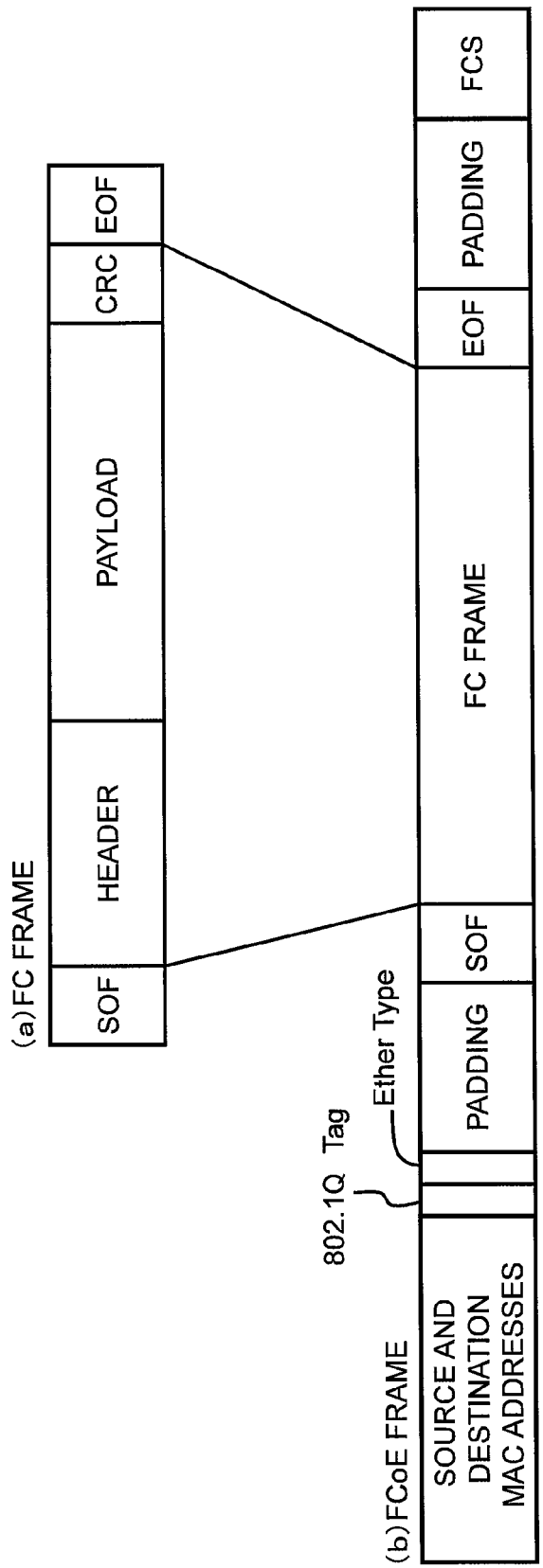
FIG. 6 is an illustration showing the difference between an FC frame and an FCoE frame.

FIG. 6 shows the configuration of an FC frame based on the FC protocol, and the configuration of an FCoE frame based on the FCoE protocol.

The FC frame shown in (a) in FIG. 6 comprises a header, a payload for storing data, and a CRC (Cyclic Redundancy Check).

The FCoE frame shown in (b) in FIG. 6 is created by encapsulating the FC frame in an Ethernet (registered trademark) frame. That is, the FCoE frame is created by adding a source MAC (Media Access Control) address and a destination MAC address, a tag, and an Ethernet type to the FC frame.

Figure 7:
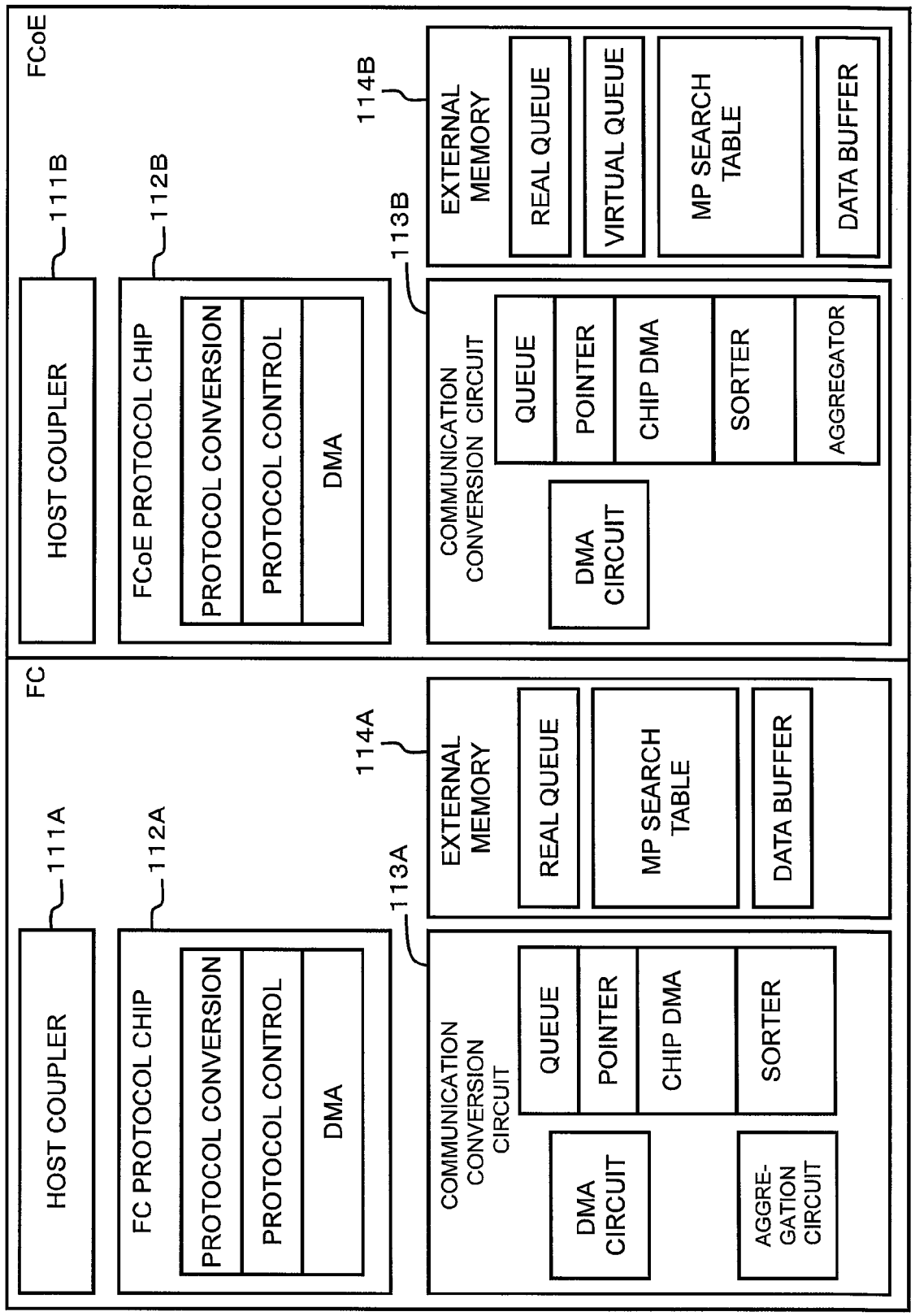
FIG. 7 shows the respective functional configurations of a channel adapter package corresponding to the FC protocol and a channel adapter package corresponding to the FCoE protocol.

FIG. 7 is an illustration contrasting the internal configuration of the FC-compatible channel adapter package 110A with the internal configuration of the FCoE-compatible channel adapter package 110B.

The FC protocol chip 112A of the FC-compatible channel adapter package 110A, for example, comprises a protocol conversion function, a protocol control function, and a DMA (Direct Memory Access) function.

The communication conversion circuit 113A, for example, comprises a DMA circuit and an aggregator circuit as hardware circuits. The communication conversion circuit 113A also comprises a queue and a pointer, which will be explained further below, a protocol chip DMA function, and a sorter function. The aggregator and sorter will each be explained further below.

The external memory 114A comprises a real queue and a MP search table, which will be explained further below, and a data buffer area. The data buffer area stores data received from the host 20 and data read from the cache memory 141.

Look at the FCoE-compatible channel adapter package 110B. The FCoE protocol chip 112B comprises a protocol conversion function, a protocol control function, and a DMA function just like the FC protocol chip 112A. The FCoE protocol chip 112B differs from the FC protocol chip 112A in that it supports the FCoE protocol.

The communication conversion circuit 113B comprises a DMA circuit as a hardware circuit. In addition, the communication conversion circuit 113B comprises a queue, a pointer, a protocol chip DMA function, a sorter function, and an aggregator function.

The external memory 114B comprises a real queue, a virtual queue, a MP search table, and a data buffer area.

Figure 8:
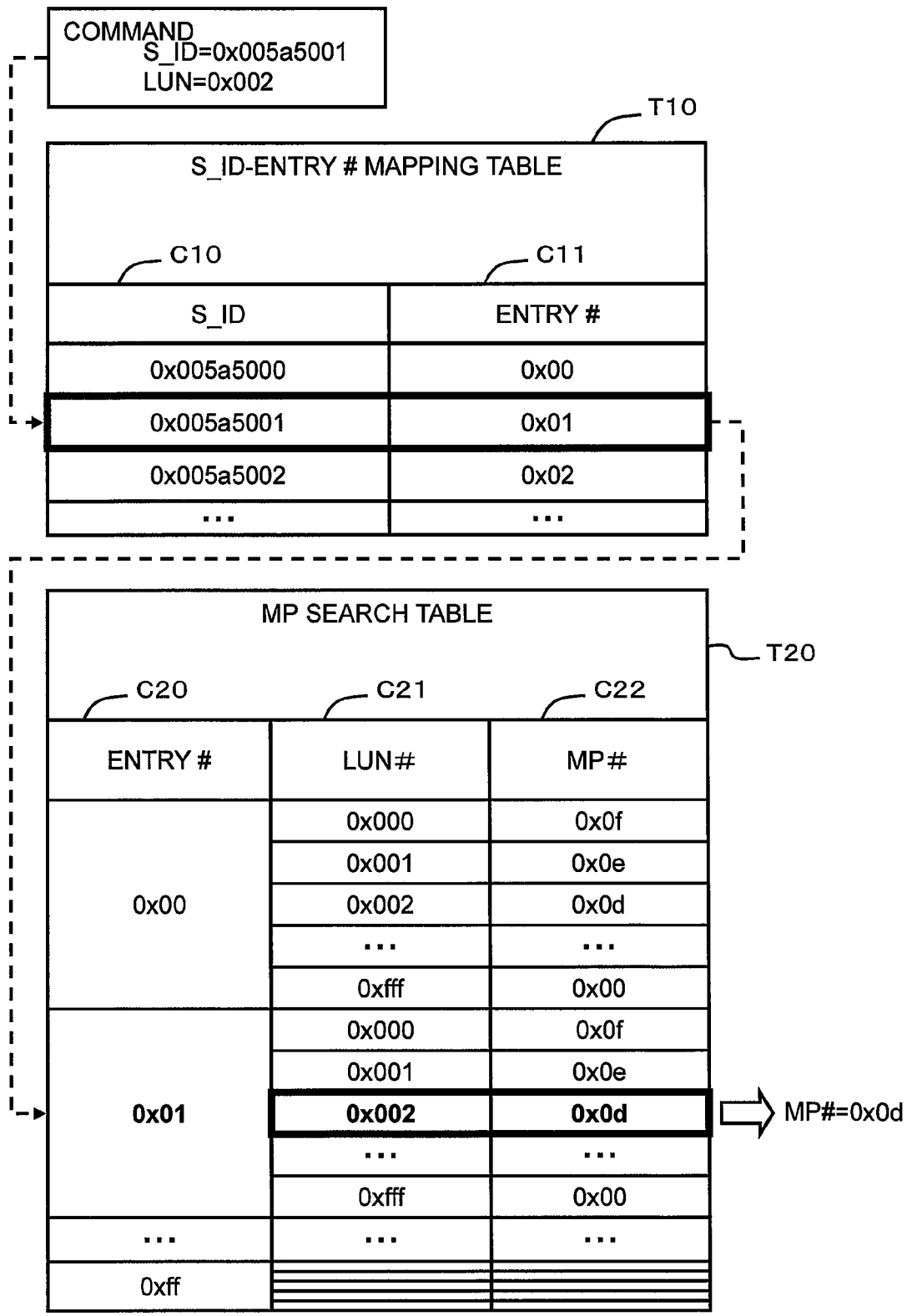
FIG. 8 is an illustration schematically showing a method for selecting a command transfer-destination microprocessor.

FIG. 8 shows a method for sorting a received command to a microprocessor 131. In this example, "sorting" means sending a received command to any of multiple microprocessors 131 and having it processed.

A command received from the host 20, as shown at the top of FIG. 8, comprises a S_ID, which denotes an address, and a LUN (Logical Unit Number), which denotes an access-destination volume. In a case where no particular distinction is made between the communication conversion circuit 113A and the communication conversion circuit 113B, this circuit will be called the communication conversion circuit 113.

The communication conversion circuit 113, based on the S_ID acquired from the command, references a table T10, which manages the corresponding relationship between the S_ID and an entry number. The S_ID-entry number mapping table T10 comprises a column C10 for storing the S_ID and a column C11 for storing the entry number. The communication conversion circuit 113 acquires from the table T10 the entry number corresponding to the S_ID included in the command.

An MP search table T20 is used for selecting one microprocessor from among multiple microprocessors. The MP search table T20, for example, comprises a column C20 for storing the entry number, a column C21 for storing the LUN, and a column C22 for storing a MP number.

The communication conversion circuit 113 selects one MP number by searching the MP search table T20 based on the entry number acquired from the mapping table T10 and the LUN acquired from the command. The communication conversion circuit 113 sends the command to the microprocessor 131 identified using the selected MP number.

Furthermore, the MP search table T20 can be rewritten as needed in accordance with the status of the storage control apparatus 10. For example, the configuration may be such that in a case where commands have been focusing on a specific microprocessor 131, command processing is allocated to another microprocessor in another microprocessor package in order to level the load.

Figure 9:
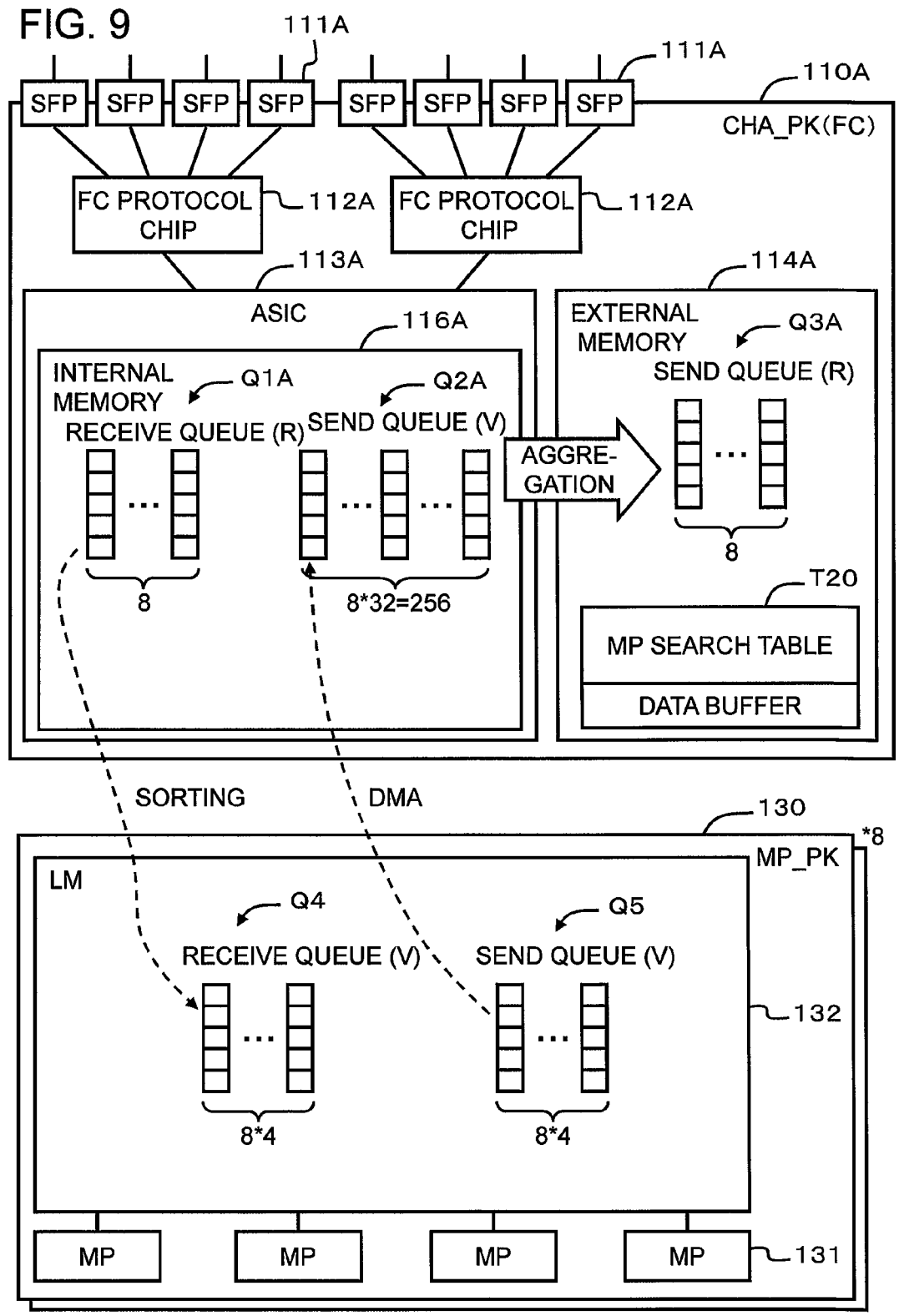
FIG. 9 shows a queue configuration of a channel adapter package corresponding to the FC protocol.

FIG. 9 shows the queue configuration of the FC-compatible channel adapter package 110A. A real receive queue Q1A and a virtual send queue Q2A are provided in the internal memory 116A of the communication conversion circuit (ASIC in the drawing) 113A. A real send queue Q3A is provided in the external memory 114A.

In the drawing, (R) is assigned to the real queue, and (V) is assigned to the virtual queue. Therefore, the real receive queue is displayed as "receive queue (R)", the virtual send queue is displayed as "send queue (V)", and the real send queue is displayed as "send queue (R)".

Look at the microprocessor package 130. A virtual receive queue Q4 and a virtual send queue Q5 are provided in the local memory 132 of the microprocessor package 130. The virtual receive queue is displayed as "receive queue (V)" and the virtual send queue is displayed as "send queue (V)".

The real queue is used to exchange real control information. The virtual queue is used to exchange virtual control information. In this example, the real control information is used between the communication conversion circuit 113 and the protocol chip 112, and the virtual control information is used between the communication conversion circuit 113 and the microprocessor 131.

The real control information will differ in accordance with the protocol chip 112 type (that is, the type of communication protocol). As will be explained further below, the communication conversion circuit 113 converts the real control information, which differs in accordance with the communication protocol, to the virtual control information, which is used only inside the storage control apparatus 10, and sends same to the selected microprocessor 131. The processing results of the microprocessor 131 are sent to the communication conversion circuit 113 using the virtual control information. The communication conversion circuit 113 converts this virtual control information to the real control information, and transfers same to the protocol chip 112.

In this way, in this example, communications with the protocol chips 112 corresponding to the respective communications protocols are carried out using a method that corresponds to the protocol chip type, and communications with the microprocessors 131 are carried out in accordance with common procedures that have been set beforehand.

The respective queues shown in FIG. 9 will be explained. The real receive queue Q1A provided in the internal memory 116A of the communication conversion circuit 113A is for storing a command transferred from the FC protocol chip 112A. The real receive queue Q1A is provided in accordance with the number of host connectors 111A. In this example, since one channel adapter package 110A comprises eight host connectors 111A, eight real receive queues Q1A are provided.

The virtual send queue Q2A inside the internal memory 116A is a virtual queue used with the respective microprocessors 131, and corresponds to the "channel-side virtual send queue". The virtual send queue Q2A is prepared in accordance with the number of host connectors 111A for each microprocessor. In this example, since a total of eight microprocessor packages 130 comprising four microprocessors 131 each are provided, the total number of microprocessors is 32. There are eight host connectors 111A. Therefore, 256 (=32×8) virtual send queues Q2A are provided.

The virtual send queue Q2A receives and stores the command processing result from the microprocessor 131. The processing result that has been stored in the virtual send queue Q2A is stored in the corresponding real send queue Q3A.

Figure 11:
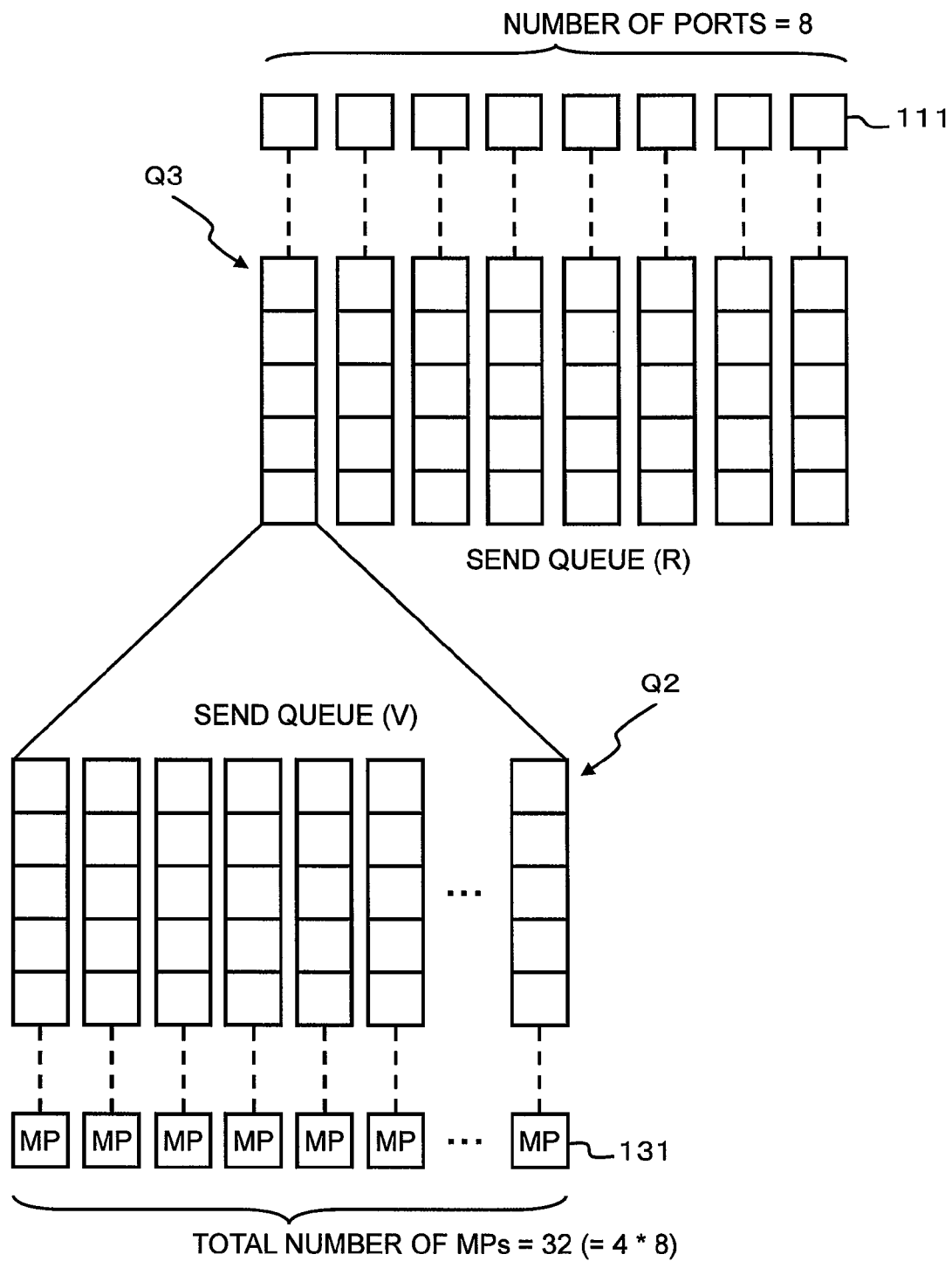
FIG. 11 schematically shows a method for associating a virtual queue prepared to coincide with the number of microprocessors with a real queue prepared to coincide with the actual number of communication ports.

Eight real send queues Q3A are prepared in accordance with the number of host connectors 111A. A processing result stored in any of the 256 virtual send queues Q2A is ultimately transferred to any one of the eight real send queues Q3A. This is because the processing result cannot be sent to the host 20 from the host coupler 111A unless this result has been stored in the real send queue Q3A. Consequently, the aggregation process described using FIG. 11 is executed.

The virtual receive queue Q4 provided in the microprocessor package 130 is for receiving a command from the real send queue Q1A inside the communication conversion circuit 113A. The virtual receive queue Q4 is provided in accordance with the number of host connectors 111A for each microprocessor 131. That is, eight virtual receive queues Q4 are prepared for each microprocessor 131. Since a single microprocessor package 130 comprises four microprocessors 131, a total of 32 (=8×4) virtual receive queues Q4 are provided in the local memory 132.

The virtual send queue Q5 provided in the microprocessor package 130 corresponds to the "microprocessor-side virtual send queue". The virtual send queue Q5 is provided corresponding to the virtual send queue Q2A of the communication conversion circuit 113A. The virtual send queue Q5 is provided in accordance with the number of host connectors 111A for each microprocessor 131.

Since a single microprocessor package 130 comprises four microprocessors 131, a total of 32 (=8×4) virtual send queues Q5 are provided in the local memory 132.

Figure 10:
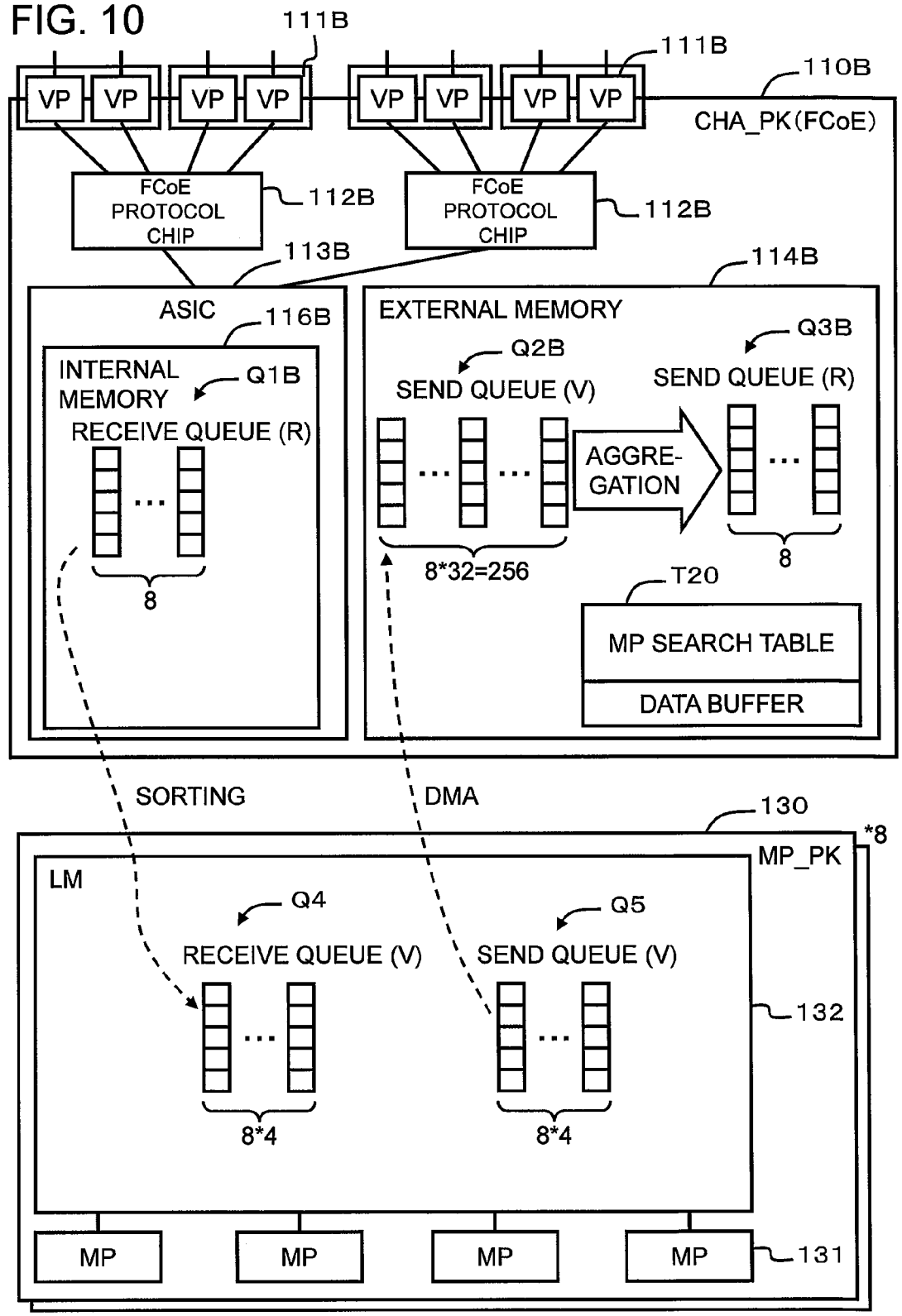
FIG. 10 shows the queue configuration of a channel adapter package corresponding to the FCoE protocol.

FIG. 10 shows the queue configuration of the FCoE-compatible channel adapter package 110B. Eight real send queues Q1B are provided in the internal memory 116B of the communication conversion circuit 113B to coincide with the number of host connectors 111B.

A virtual send queue Q2B and a real send queue Q3B are provided in the external memory 114B coupled to the communication conversion circuit 113B. The difference with the configuration shown in FIG. 9 is the location of the virtual send queue Q2B. In this example, because the communication conversion circuit 113 is designed on the basis of the FC protocol, the FCoE virtual send queue Q2B is provided inside the external memory 114B. In accordance with this, numerous types of communication protocols can be supported without much increase in the manufacturing costs of the communication conversion circuit 113.

A total of 256 (=32×8) virtual send queues Q2B is provided in accordance with the number of host connectors 111B for each microprocessor 131. Eight real send queues Q3B are provided in accordance with the number of host connectors 111B.

FIG. 11 is an illustration schematically showing an aggregation process. A total of 256 virtual send queues Q2 (in a case where no distinction is made between the Q2A and the Q2B, the queue will be called Q2) is provided inside the channel adapter package 110 in accordance the number of microprocessors 131 for each host coupler 111 (111A or 111B) as described hereinabove.

In contrast to this, eight real send queues Q3 (in a case where no distinction is made between the Q3A and the Q3B, the queue will be called Q3), which are actually used to send a processing result (response) to the host 20, are prepared to coincide with the number of host connectors 111.

In this example, as shown in FIG. 11, each real send queue Q3 is associated with the virtual send queues Q2 of the number of microprocessors 131 (32). The communication conversion circuit 113 merges the virtual send queues Q2 in which the processing results are stored and allocates the virtual send queue Q2 to any of the real send queues Q3.

Figure 12:
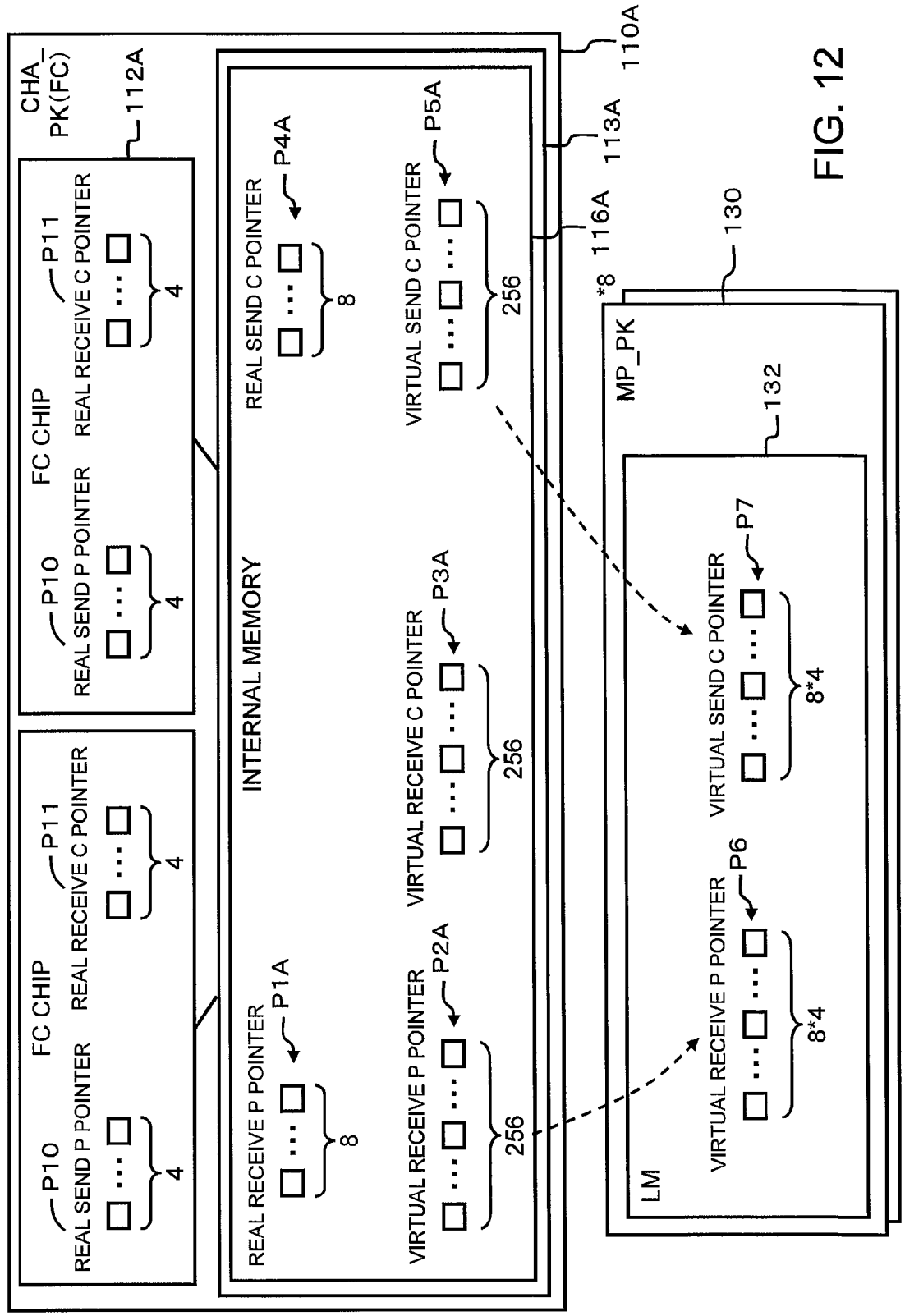
FIG. 12 shows the configuration of a queue pointer of the channel adapter package corresponding to the FC protocol.

FIG. 12 is an illustration showing the configuration of the pointer in the FC-compatible channel adapter package 110A. The pointer is management information for managing the updating of a real queue and a virtual queue. The operation of the pointer will be explained in detail further below, but a simplified explanation of the relationship between the queue and the pointer will be given here.

The FC protocol chip (abbreviated as FC chip in the drawing) 112A comprises a real send P pointer P10 and a real receive C pointer P11. The P pointer shows the number of jobs (for example commands) to be processed. The C pointer shows the number of jobs that have been processed.

The real send P pointer P10 manages the number of jobs related to a send, that is, for example, the number of responses (either data or status) that the protocol chip 112 is to send to the host 20. The real receive C pointer P11 manages the number of jobs related to a receive, that is, for example, the number of commands that have been received from the host 20.

A real receive P pointer P1A, a virtual receive P pointer P2A, a virtual receive C pointer P3A, a real receive C pointer P4A, and a virtual send C pointer P5A are provided in the internal memory 116A of the communication conversion circuit 113A.

The real receive P pointer P1A shows that a command to be processed has been received. The protocol chip 112A, upon receiving the command, updates (adds) the value of the real receive P pointer P1A and notifies the communication conversion circuit 113A of the fact that a command has been received. The command is stored in the real receive queue Q1A of the communication conversion circuit 113A.

The virtual receive P pointer P2A is used for notifying the microprocessor 131 of the existence of the command to be processed. The communication conversion circuit 113A determines the sorting-destination microprocessor of the received command, and sends the command to this microprocessor. The command is stored in the virtual receive queue Q4 corresponding to the command sorting-destination microprocessor 131.

The communication conversion circuit 113A updates the value of the virtual receive P pointer P2A related to the microprocessor 131 of the command destination (command sorting destination). In addition, the communication conversion circuit 113A also updates the value of a virtual receive P pointer P6 corresponding to the command-destination microprocessor 131. The microprocessor 131, upon the value of the virtual receive P pointer corresponding to itself being changed, learns that a command to be processed has been allocated.

In addition, the communication conversion circuit 113A also updates the value of the real receive C pointer inside the protocol chip 112A. In accordance with this, the protocol chip 112A learns that the command received from the host 20 has been transferred to the microprocessor 131.

The microprocessor 131 that receives the command executes the processing (a read process or a write process) in accordance with this command and creates a response parameter. The microprocessor 131 stores "response showing command processing result" as the response parameter in the virtual send queue Q5. In addition, the microprocessor 131 transfers and stores the response parameter in the virtual send queue Q2A of the communication conversion circuit 113A.

When the response parameter is stored in the virtual send queue Q2A, the communication conversion circuit 113A transfers this response parameter to any of the real send queues Q3A. The communication conversion circuit 113A updates the value of the real send P pointer inside the protocol chip 112A. The protocol chip 112A, upon confirming the real send P pointer update, sends the response parameter to the host 20.

The communication conversion circuit 113A updates the value of the real send C pointer P4A after updating the value of the real send P pointer of the protocol chip 112A. In addition, the communication conversion circuit 113A updates the value of the virtual send C pointer P5A corresponding to the updated real send C pointer P4A.

When the virtual send C pointer P5A of the communication conversion circuit 113A is updated, the value of a virtual send C pointer P7 associated with the microprocessor 131 corresponding to this virtual send C pointer P5A is also updated. In accordance with this, the microprocessor 131 learns that the response parameter has been sent, and confirms that the job has been completed.

Figure 13:
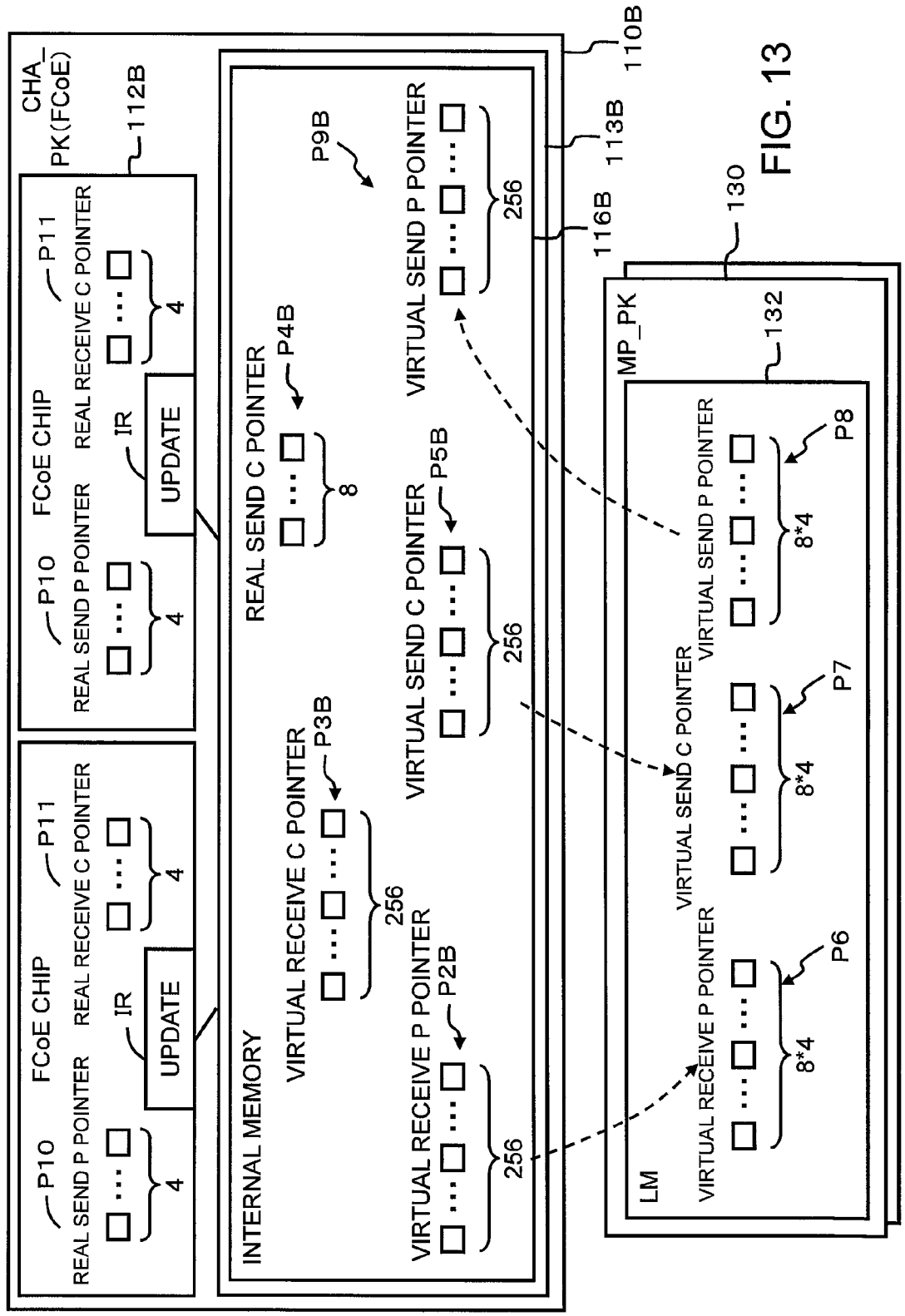
FIG. 13 shows the configuration of a queue pointer of the channel adapter package corresponding to the FCoE protocol.

FIG. 13 is an illustration showing the pointer configuration of the FCoE-compatible channel adapter package 110B. The explanation will focus on the differences with FIG. 12.

An interrupt register IR for notifying of an update is provided in the protocol chip 112B in addition to the real send P pointer P10 and the real receive C pointer P11. The interrupt register IR notifies the communication conversion circuit 113B that a command from the protocol chip 112B has been stored in the receive queue Q1B of the communication conversion circuit 113B.

Therefore, the communication conversion circuit 113B does not comprise the real receive P pointer P1A shown in FIG. 12. This is because the communication conversion circuit 113B learns that the real receive queue Q1B has been updated by checking the value of the interrupt register IR.

In this way, the method for notifying the communication conversion circuit 113B of a received command in the FCoE-compatible channel adapter package 110B differs from that of the FC-compatible channel adapter package 110A. This difference may be called the receiving difference.

The communication conversion circuit 113B comprises a virtual receive P pointer P2B, a virtual receive C pointer P3B, a real send C pointer P4B, and a virtual receive C pointer P5B the same as that of FIG. 12. A virtual receive P pointer P6 and a virtual send C pointer P7 are provided in the local memory 132 of the microprocessor package 130 the same as that of FIG. 12.

In addition, a virtual send P pointer P8 is provided in the local memory 132 of the microprocessor package 130. A virtual send P pointer P9B, which corresponds to the virtual send P pointer P8, is provided in the communication conversion circuit 113B.

The microprocessor 131 updates the value of the virtual send P pointer P8 after having transferred a command response parameter from the virtual send queue Q5 to the virtual send queue Q2B inside the external memory 114B of the communication conversion circuit 113B.

When the virtual send P pointer P8 on the microprocessor package 130 side is updated, the virtual send P pointer P9B of the communication conversion circuit 113B is also updated in conjunction therewith. The communication conversion circuit 113B learns that the response parameter has been stored in the virtual send queue Q2B when the virtual send P pointer P9B is updated.

In the case of the FC-compatible channel adapter package 110A, the microprocessor 131 transfers and stores the response parameter in the virtual send queue Q2A provided in the internal memory 116A of the communication conversion circuit 113A. The FC-compatible channel adapter package 110A immediately learns that the virtual send queue Q2A inside the internal memory 116A has been updated.

Alternatively, in the case of the FCoE-compatible channel adapter package 110B, the virtual receive queue Q2B is not in the internal memory 116B of the communication conversion circuit 113B, but rather is provided in the external memory 114B. Therefore, the communication conversion circuit 113B is not able to detect the fact that the virtual receive queue Q2B has been updated by the microprocessor 131. Consequently, in the case of the FCoE-compatible channel adapter package 110B, the communication conversion circuit 113B is notified of the updating of the virtual send queue Q2B using the virtual send P pointers P8 and P9B.

In this way, the method for notifying the communication conversion circuit 113B of the fact that a response parameter has been created in the FCoE-compatible channel adapter package 110B differs from that of the FC-compatible channel adapter package 110A. This difference may be called the sending difference.

Figure 14:
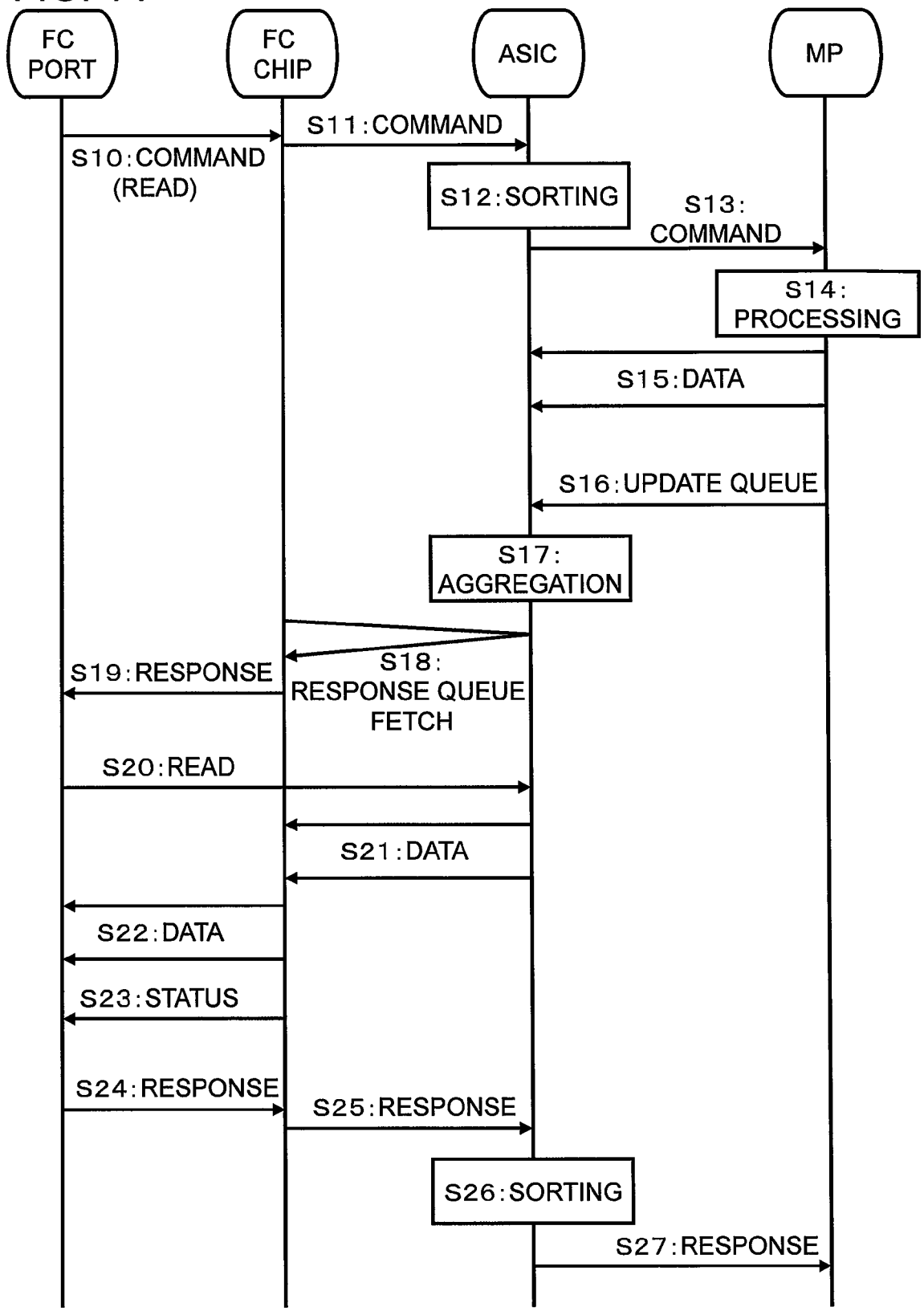
FIG. 14 is a flowchart showing the processing of an FC frame comprising a read command.

The operation of the storage control apparatus 10 will be explained by referring to FIGS. 14 through 24. FIG. 14 shows the overall processing in a case where a read command stored in an FC frame is received. This processing will be explained in detail below.

When the host coupler (FC port in the drawing) 111A receives a read command sent from the host 20, the host coupler 111A transfers this read command to the FC protocol chip (FC chip in the drawing) 112A (S10). The FC protocol chip 112A stores the read command in the real receive queue Q1A of the communication conversion circuit (ASIC in the drawing) 113A (S11).

The communication conversion circuit 113A decides on the microprocessor 131 that will process the read command from among the microprocessors 131 inside the storage control apparatus 10 (S12). The communication conversion circuit 113A transfers and stores the read command in the virtual receive queue Q4 corresponding to the determined microprocessor 131 (S13).

The microprocessor 131 reads the data requested by the read command from the storage device 171, and transfers same to the cache memory 141 (S14). This data transfer is also one of the response parameters. Furthermore, there may be a case where the read command-requested data is already stored in the cache memory 141.

The microprocessor 131 transfers the data stored in the cache memory 141 to the data buffer provided in the external memory 114A of the communication conversion circuit 113A and stores this data in this buffer (S15). When the data transfer has ended, the microprocessor 131 updates the virtual send queues Q5 and Q2A (S16).

The communication conversion circuit 113A carries out an aggregation process upon learning of the data receive as a result of the updating of the virtual send queue Q2A (S17). The communication conversion circuit 113A selects one real send queue Q3A corresponding to the microprocessor 131 that has processed the read command.

The FC protocol chip 112A checks that data transfer preparations are in order (S18), and notifies the host coupler 111A that data transfer preparations are complete (S19). The host coupler 111A reads the data from the data buffer inside the external memory 114B (S20).

The data inside the data buffer is transferred to the host coupler 111A via the FC protocol chip 112A (S21, S22). The FC protocol chip 112A sends a status to the host coupler 111A showing that data transfer ended normally (S23).

The host coupler 111A sends the data to the host 20 and responds to the FC protocol chip 112A to the effect that the data transfer was completed normally (S24). This response is sent to the communication conversion circuit 113A from the FC protocol chip 112A (S25). The communication conversion circuit 113A identifies the microprocessor 131 that constitutes the destination of this response (S26), and sends the response to this microprocessor 131 (S27).

Figure 15:
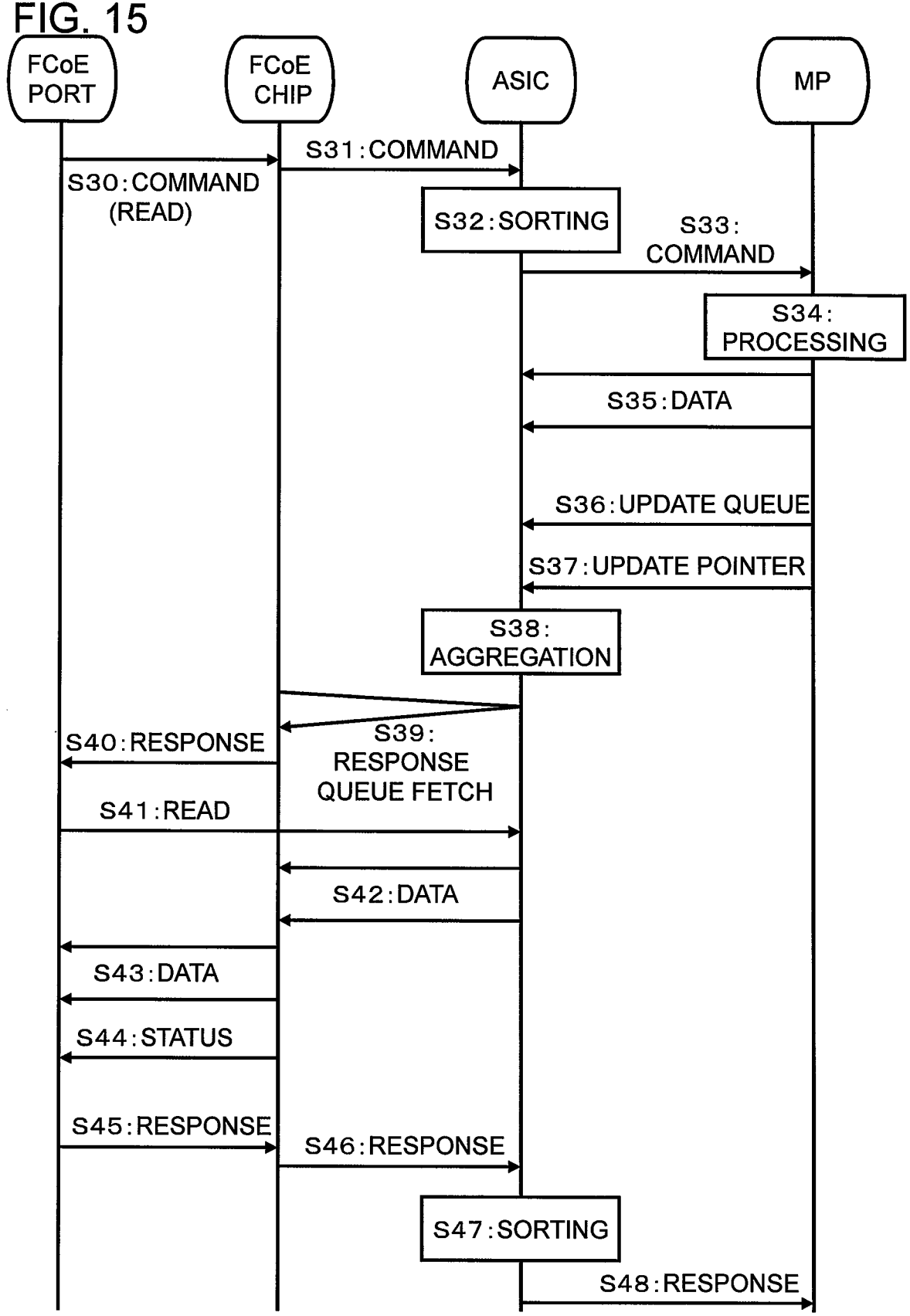
FIG. 15 is a flowchart showing the processing of an FCoE frame comprising a read command.

FIG. 15 shows the overall processing in a case where a read command stored in an FCoE frame is received. This process includes most of the steps common to the processing shown in FIG. 14. That is, S30 through S36 of FIG. 15 correspond to S10 through S16 of FIG. 14, and S38 through S48 of FIG. 15 correspond to S17 through S27 of FIG. 14. Explanations of the corresponding steps will be omitted.

In FIG. 15, after storing the data inside the cache memory 141 in the data buffer of the external memory 114B, the microprocessor 131 updates the virtual send P pointers P8 and P9B (S37). S37 is the point at which the flowchart of FIG. 15 differs from the flowchart of FIG. 14. In the processing of FIG. 15, the communication conversion circuit 113B is notified of the fact that the virtual send queue Q2B inside the external memory 114B has been updated in accordance with the updating of the virtual send P pointers P8 and P9B.

Figure 16:
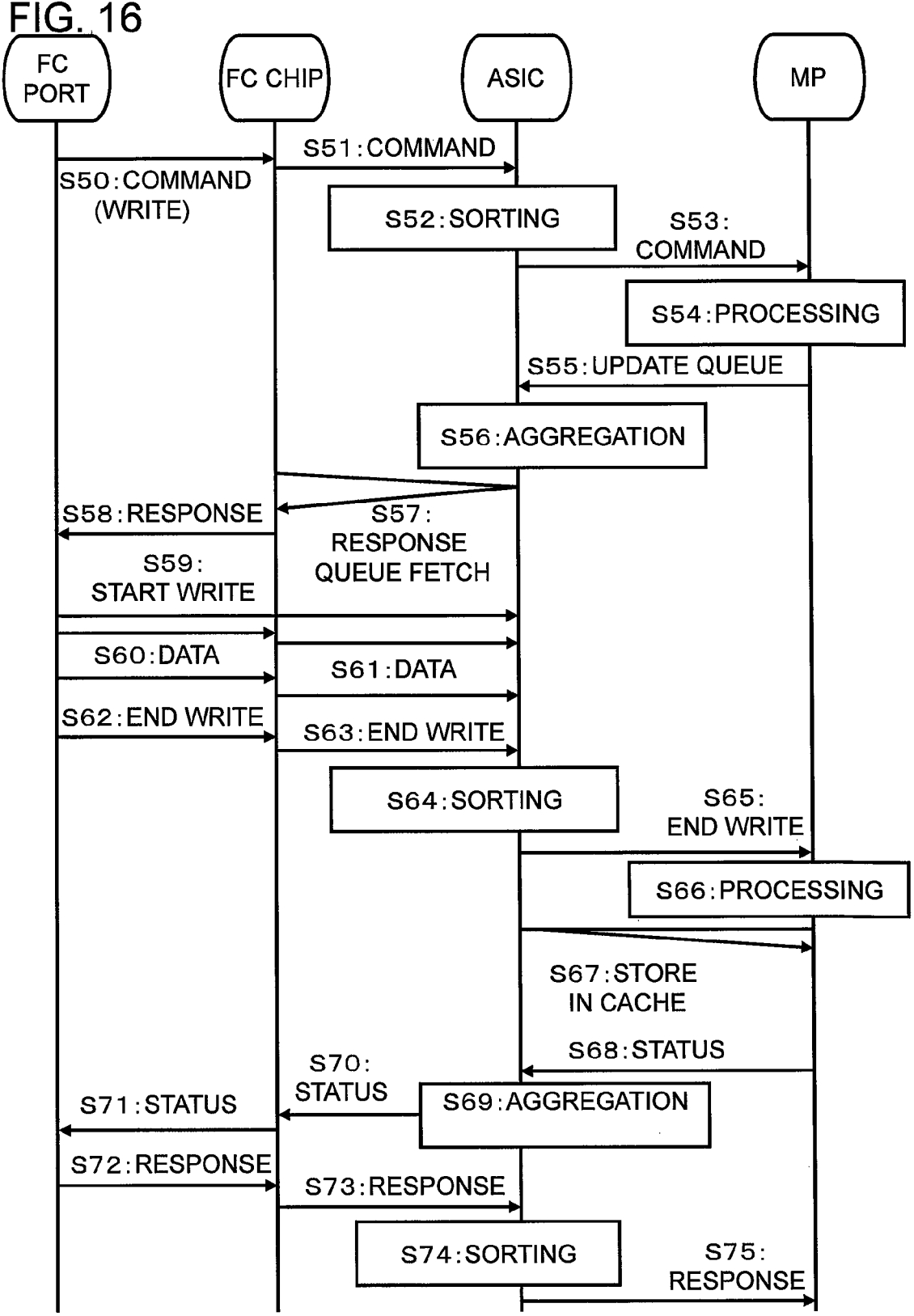
FIG. 16 is a flowchart showing the processing of an FC frame comprising a write command.

FIG. 16 shows a case where a write command stored in an FC frame is received. The host coupler 111A sends the write command received from the host 20 to the FC protocol chip 112A (S50).

The FC protocol chip 112A sends the write command to the communication conversion circuit 113A (S51).

The communication conversion circuit 113A selects from among the microprocessors 131 one microprocessor 131 that will constitute the destination of the write command (S52), and sends the write command to this microprocessor 131 (S53).

The microprocessor 131, upon receiving the write command, carries out a process for securing an area in the cache memory 141 for storing the write data (S54). The microprocessor 131 notifies the communication conversion circuit 113A of the response parameter showing that the processing has been completed by updating the send virtual queues Q5 and Q2A (S55).

The communication conversion circuit 113A, in accordance with the above-described aggregation process, stores the response parameter in one of the real send queues Q3A (S56). This response parameter is sent to the host coupler 111A via the FC protocol chip 112A (S57, S58). The host coupler 111A sends the host 20 to the effect that write data receive preparations are in order. The host 20 starts to write the write data (S59).

The write data is written from the host coupler 111A to the data buffer inside the external memory 114A of the communication conversion circuit 113A via the FC protocol chip 112A (S60, S61).

When the write data send is complete, the host coupler 111A transfers information showing end-write received from the host 20 to the FC protocol chip 112A (S62). This end-write is transferred from the FC protocol chip 112A to the communication conversion circuit 113A (S63).

The communication conversion circuit 113A selects one microprocessor 131 to be notified of the end-write (S64), and transfers the end-write to the selected microprocessor 131 (S65).

The microprocessor 131, upon receiving the end-write, executes a transfer process (S66). The microprocessor 131 transfers the write data stored in the data buffer of the external memory 114A and stores same in the cache memory 141 (S67).

When the data store to the cache memory 141 is complete, the microprocessor 131 transfers a status to this effect to the communication conversion circuit 113A (S68). The communication conversion circuit 113A selects one of the real send queues Q3A corresponding to this microprocessor 131 (S69), and transfers the status to the host coupler 111A via the FC protocol chip 112A (S70, S71). The host coupler 111A sends the status to the host 20. The host 20 sends the response to the effect that the status was received to the host coupler 111A.

The host coupler 111A transfers the response received from the host 20 to the FC protocol chip 112A (S72). This response is transferred from the FC protocol chip 112A to the communication conversion circuit 113A (S73). The communication conversion circuit 113A selects one microprocessor 131 to which to send this response (S74), and sends the response to this microprocessor 131 (S75).

Figure 17:
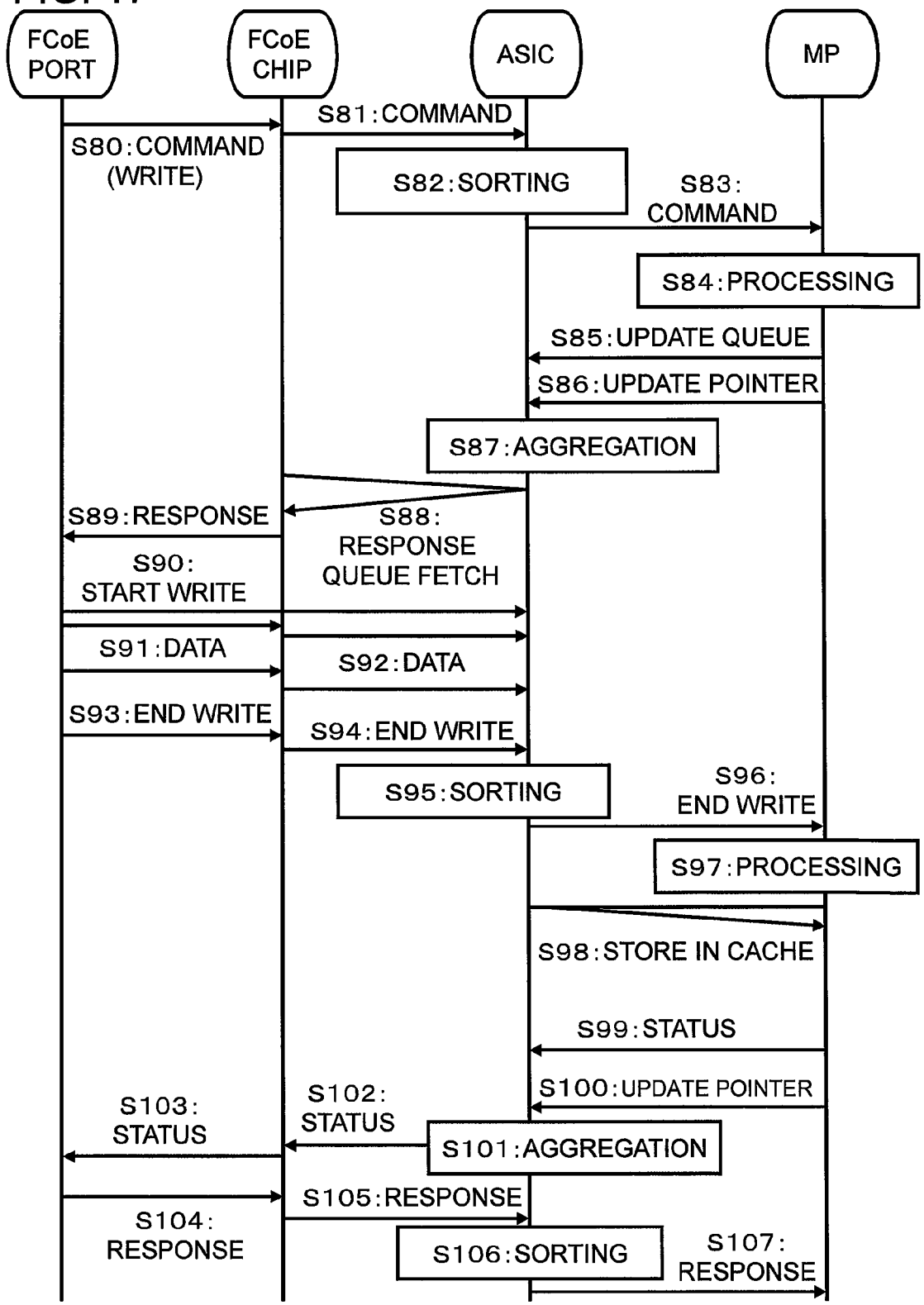
FIG. 17 is a flowchart showing the processing of an FCoE frame comprising a write command.

FIG. 17 shows a case where a write command stored in an FCoE frame is received. The flowchart of FIG. 17 includes most of the steps common to the flowchart of FIG. 16. That is, S80 through S85 of FIG. 17 correspond to S50 through S55 of FIG. 16. S87 through S99 of FIG. 17 correspond to S56 through S68 of FIG. 16. S101 through S107 of FIG. 17 correspond to S69 through S75 of FIG. 16. Explanations of the corresponding steps will be omitted.

The points of difference between FIG. 16 and FIG. 17 are S86 and S100. That is, in a case where the microprocessor 131 stores a response parameter in the virtual send queue Q2B of the communication conversion circuit 113B, the microprocessor 131 updates the value of the virtual send P pointer P8 (S86, S100).

Figure 18:
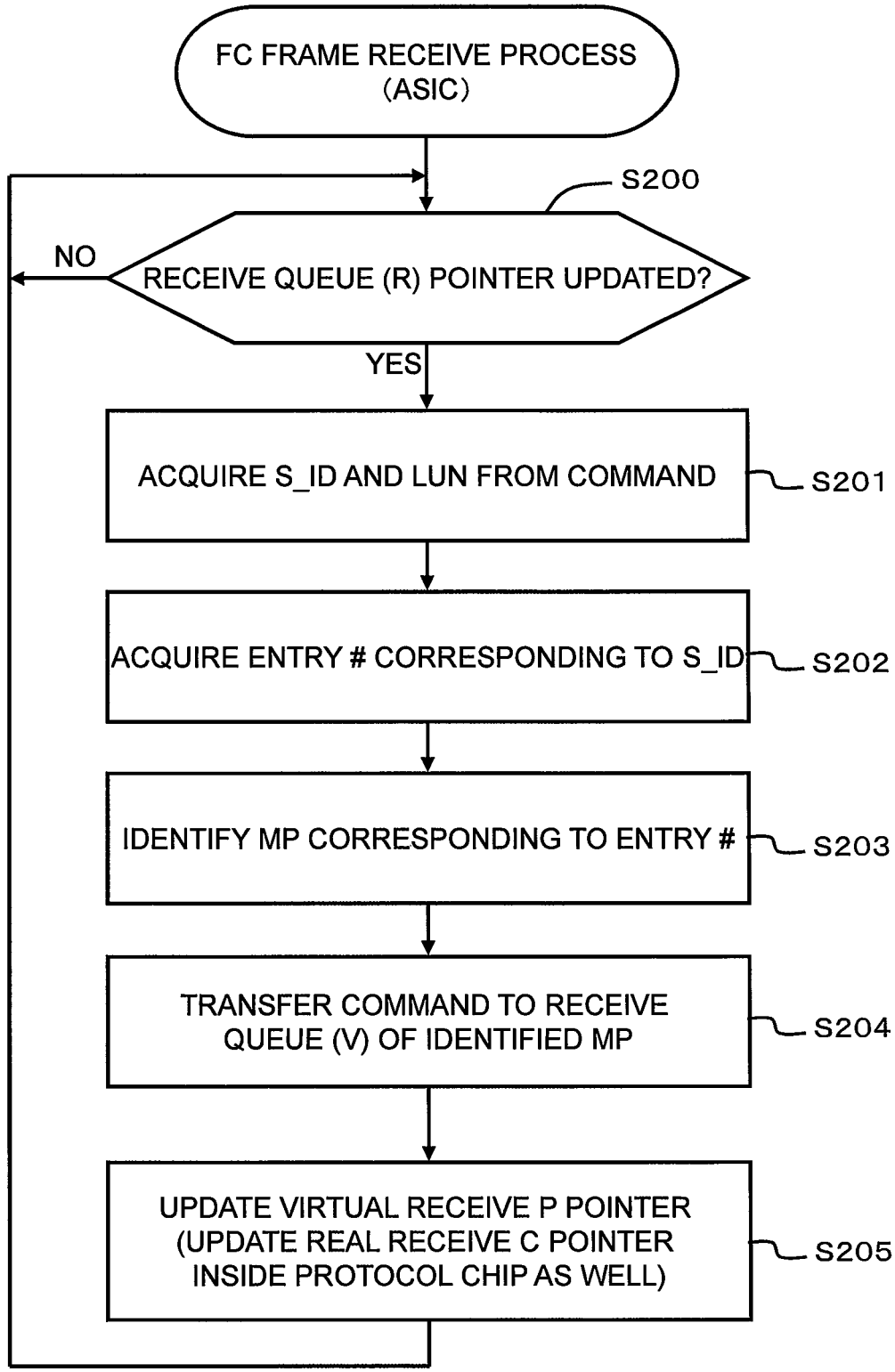
FIG. 18 is a flowchart showing the processing in a case where a communication conversion circuit inside the channel adapter package has received an FC frame.

FIG. 18 is a flowchart showing the processing in a case where the communication conversion circuit 113A receives an FC frame. This process is executed in S11 and S25 of FIG. 14, and in S51, S63 and S73 of FIG. 16.

The communication conversion circuit 113A determines whether or not the real receive P pointer P1A has been updated (S200). When a command is stored in the real receive queue Q1A and this queue Q1A is updated, the real receive P pointer P1A is also updated.

When the real receive P pointer P1A is updated (S200: YES), the communication conversion circuit 113A acquires a S_ID and a LUN from the command stored in the real receive queue Q1A (S201). The communication conversion circuit 113A acquires an entry number corresponding to the S_ID in accordance with the method shown in FIG. 8 (S202), and selects one microprocessor 131 corresponding to this entry number (S203).

The communication conversion circuit 113A transfers the command to the virtual receive queue Q4 corresponding to the selected microprocessor 131 (S204). The communication conversion circuit 113A updates the virtual receive P pointers P2A and P6 (S205). Since the receive job of the FC protocol chip 112A is completed in accordance with the command being transferred to the microprocessor 131, the real receive C pointer P11 of the FC protocol chip 112A is also updated.

Figure 19:
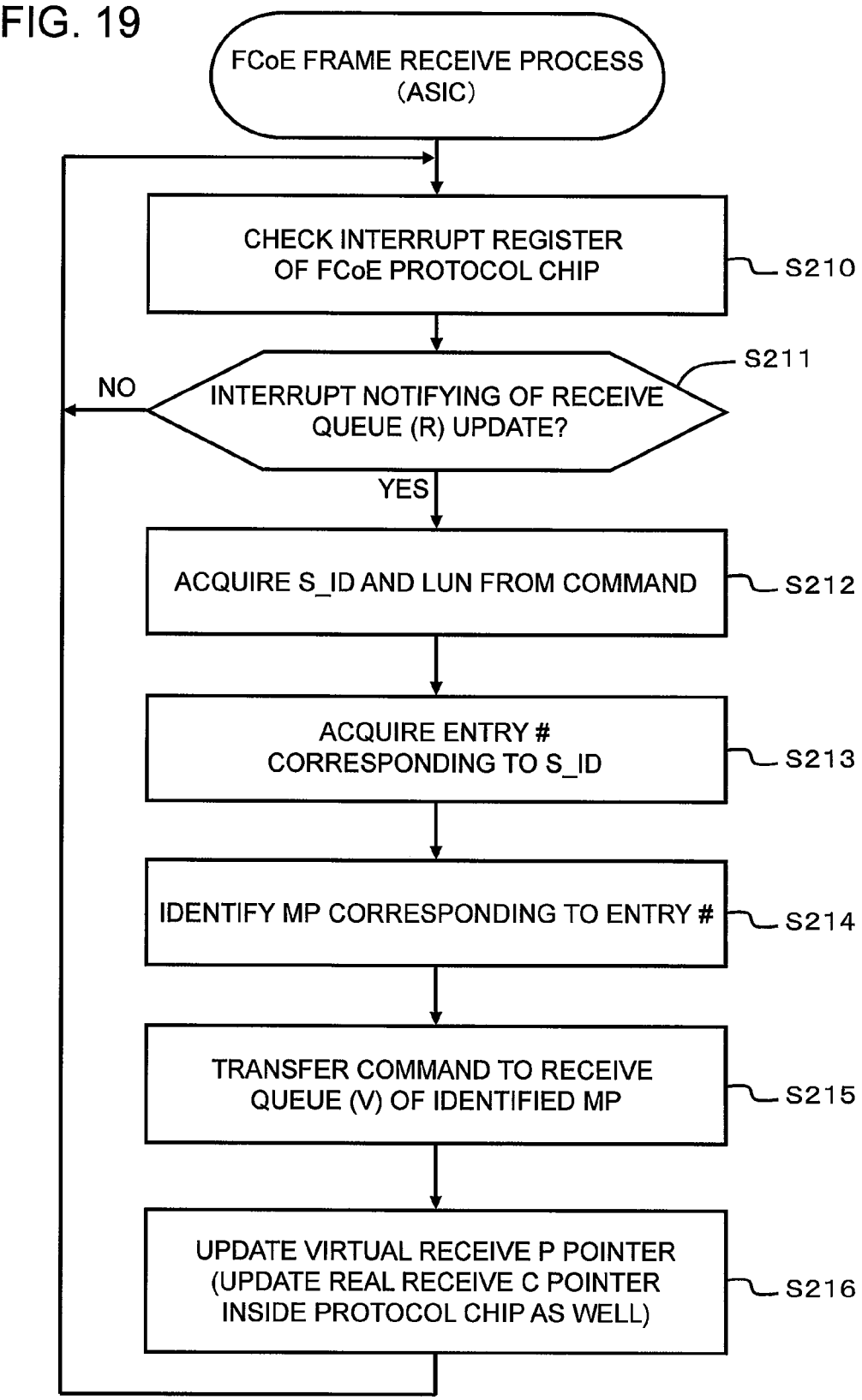
FIG. 19 is a flowchart showing the processing in a case where the communication conversion circuit inside the channel adapter package has received an FCoE frame.

FIG. 19 is a flowchart showing the processing in a case where the communication conversion circuit 113A receives an FCoE frame. This process is executed in S31 and S46 of FIG. 15, and in S81, S94 and S105 of FIG. 17.

The communication conversion circuit 113B checks the value of the interrupt register IR of the FCoE protocol chip 112B (S210), and determines whether or not an interrupt denoting that the real receive queue Q1B was updated has occurred (S211).

The communication conversion circuit 113B, upon discovering an interrupt denoting an update notification (S211: YES), acquires the S_ID and the LUN from the command stored in the real receive queue Q1B (S212). The communication conversion circuit 113B identifies the entry number from the S_ID the same as described hereinabove (S213), and identifies a microprocessor number from the entry number (S214).

The communication conversion circuit 113B sends the command to and stores same in the virtual receive queue Q4 corresponding to the identified microprocessor 131 (S215). The communication conversion circuit 113B updates the virtual receive P pointers P2B and P6 (S216). The same as described hereinabove, the real receive C pointer P11 of the FCoE protocol chip 112B is also updated.

Figure 20:
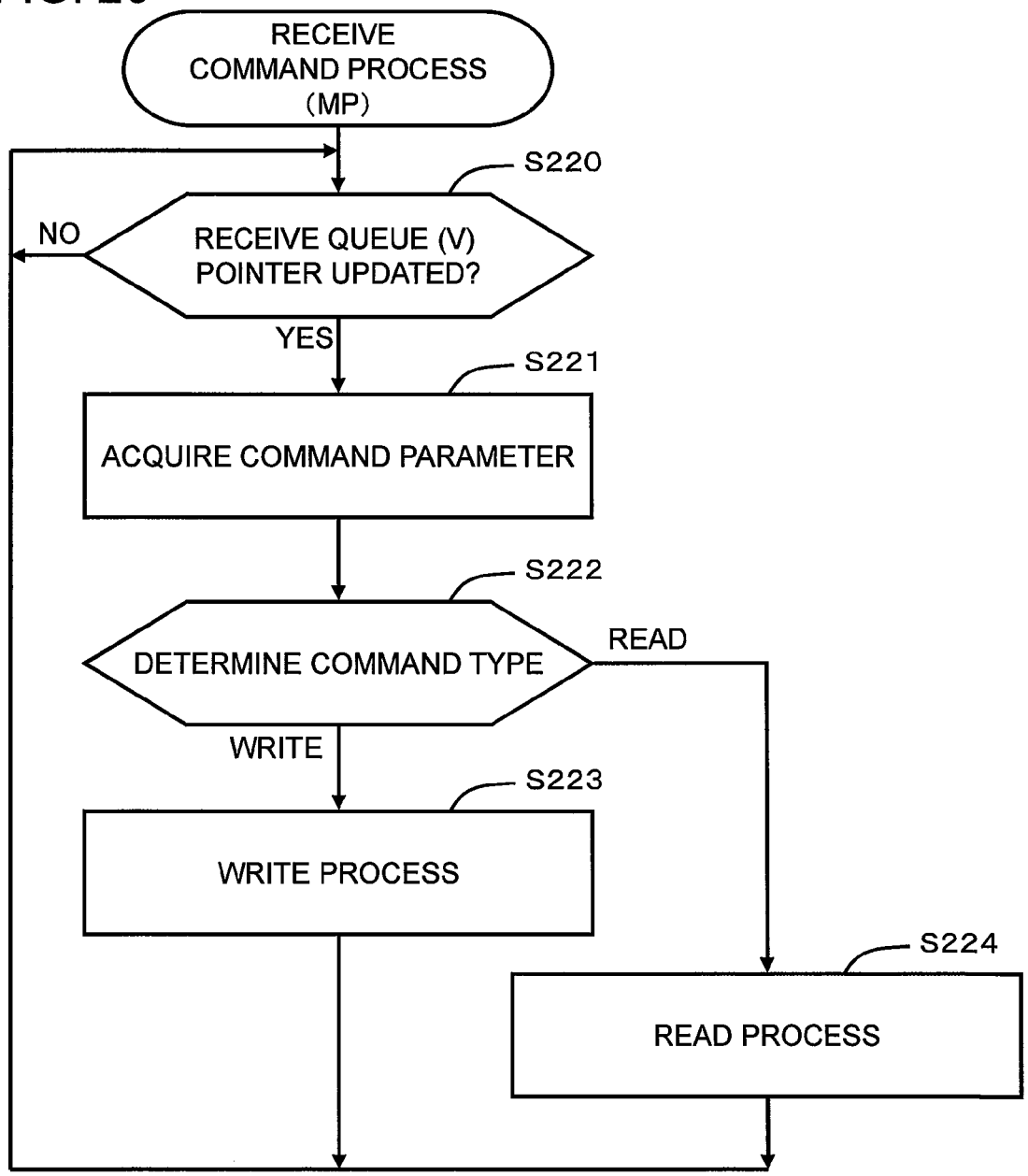
FIG. 20 is a flowchart showing an overview of command processing by a microprocessor.

FIG. 20 shows the processing of the microprocessor 131 that received the command. This processing is common to both the FC protocol and FCoE protocol. This processing is executed in S14 of FIG. 14, S34 of FIG. 15, S54 and S66 of FIG. 16, and S84 and S97 of FIG. 17.

The microprocessor 131 determines whether or not the virtual receive P pointer P6, which denotes the updating of the virtual receive queue Q4, has been updated (S220). In a case where the virtual receive P pointer P6 has been updated (S220: YES), the microprocessor 131 acquires the parameter from the command stored in the virtual receive queue Q4 (S221).

The microprocessor 131 determines the type of this command (S222). The microprocessor 131 executes a write process in the case of a write command (S223) and executes a read process in the case of a read command (S224).

Figure 21:
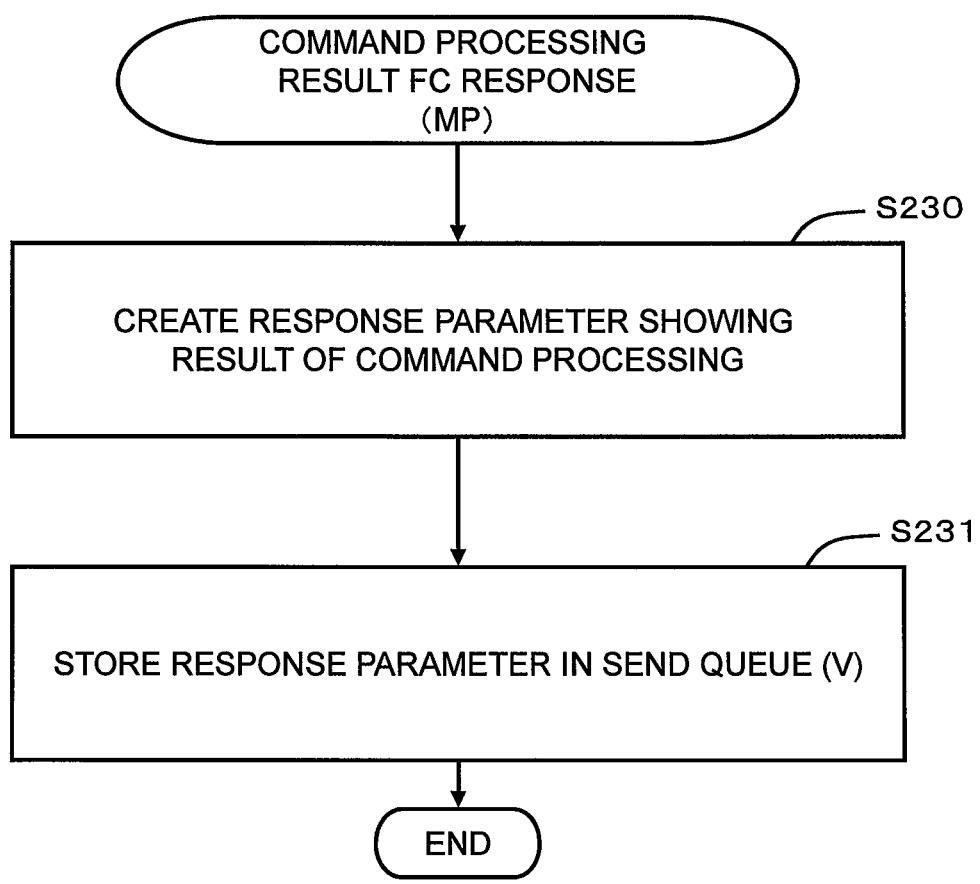
FIG. 21 is a flowchart showing the processing by the microprocessor in a case where a command processing result is returned by storing same in the FC frame.

FIG. 21 shows the processing in a case where the processing result of the command executed by the microprocessor 131 is stored in an FC frame and sent as a response. This processing is executed in S16 of FIG. 14, and S55 and S68 of FIG. 16. The microprocessor 131 creates a response parameter denoting the result of command processing (S230).

The microprocessor 131 stores the response parameter in the virtual send queue Q2A inside the internal memory 116A of the communication conversion circuit 113A via the virtual send queue Q5 inside the local memory 132 (S231).

Figure 22:
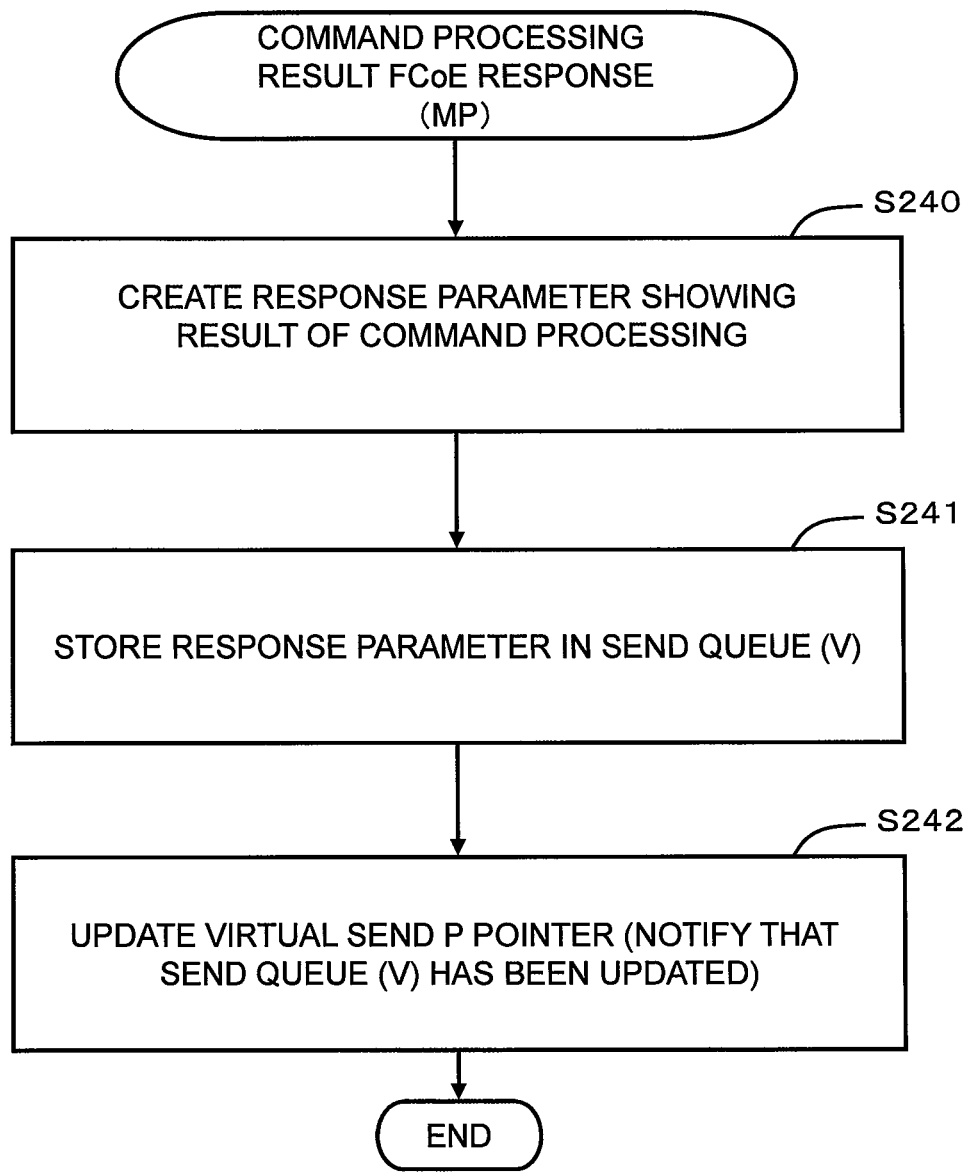
FIG. 22 is a flowchart showing the processing by the microprocessor in a case where a command processing result is returned by storing same in the FCoE frame.

FIG. 22 shows the processing in a case where the processing result of the command executed by the microprocessor 131 is stored in an FCoE frame and sent as a response. This processing is executed in S36 and S37 of FIG. 15, S85 and S86 of FIG. 17, and S99 and S100 of FIG. 17.

The same as described hereinabove, the microprocessor 131 creates a response parameter denoting the result of the command processing (S240), and stores this response parameter in the virtual send queue Q2B inside the external memory 114B of the communication conversion circuit 113B (S241).

In addition, the microprocessor 131 notifies the communication conversion circuit 113B that the virtual send queue Q2B has been updated by updating the virtual send P pointers P8 and P9B (S242).

Figure 23:
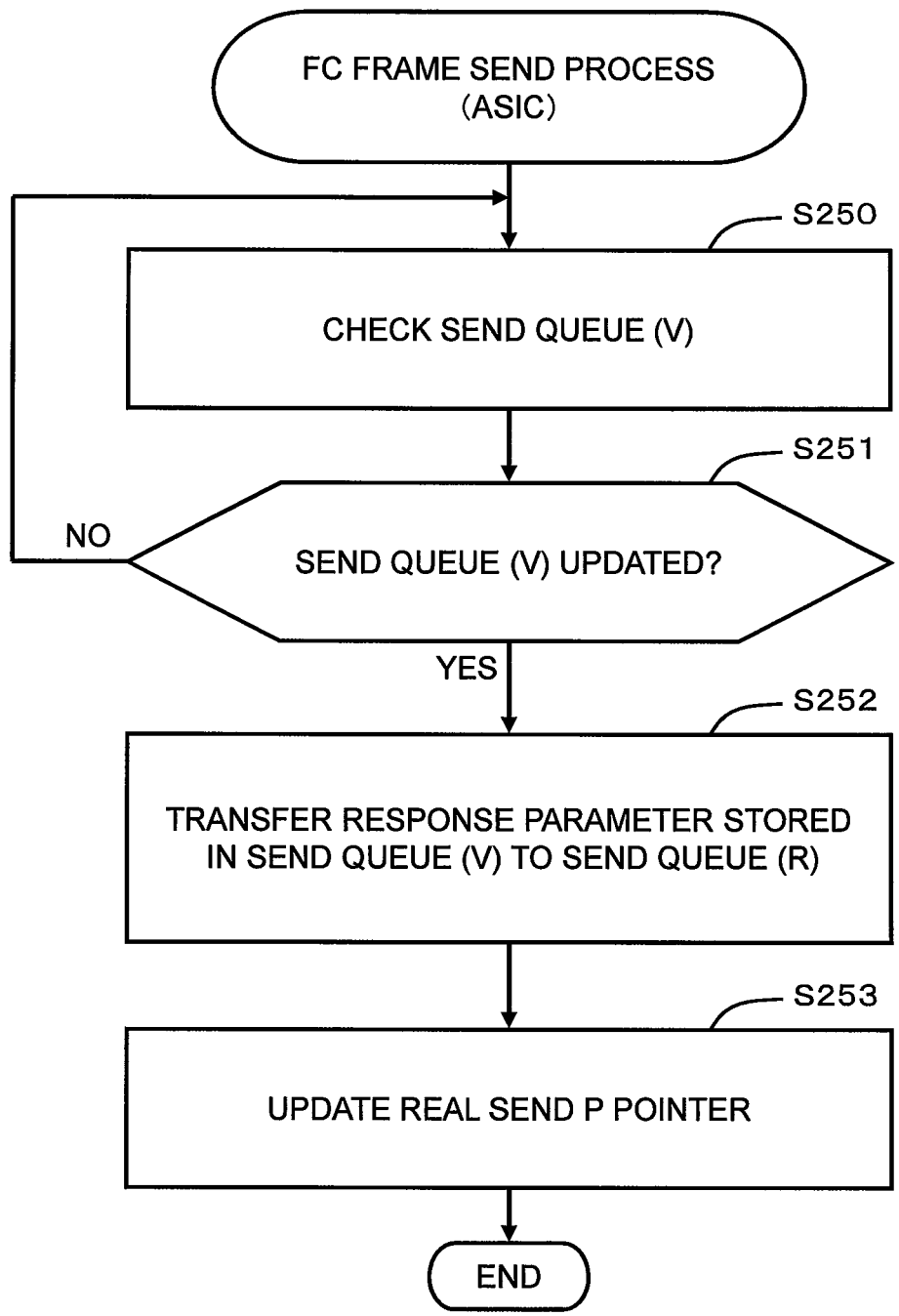
FIG. 23 is a flowchart showing a process in which the communication conversion circuit inside the channel adapter package sends an FC frame to a host.

FIG. 23 is a flowchart showing the processing for sending an FC frame from the host coupler 111A to the host 20. This processing is executed in S17 of FIG. 14, and in S56 and S69 of FIG. 16.

The communication conversion circuit 113A checks the virtual send queue Q2A (S250) and determines whether or not the virtual send queue Q2A has been updated (S251).

In a case where the virtual send queue Q2A has been updated (S251: YES), the communication conversion circuit 113A transfers the response parameter stored in the virtual send queue Q2A to a predetermined real send queue Q3A of the respective real send queues Q3A and stores same therein (S252).

The communication conversion circuit 113A updates the real send P pointer P10 of the FC protocol chip 112A (S253). In accordance with this, the FC protocol chip 112A sends a response to the host 20 from the host coupler 111A based on the response parameter stored in the real send queue Q3A.

Figure 24:
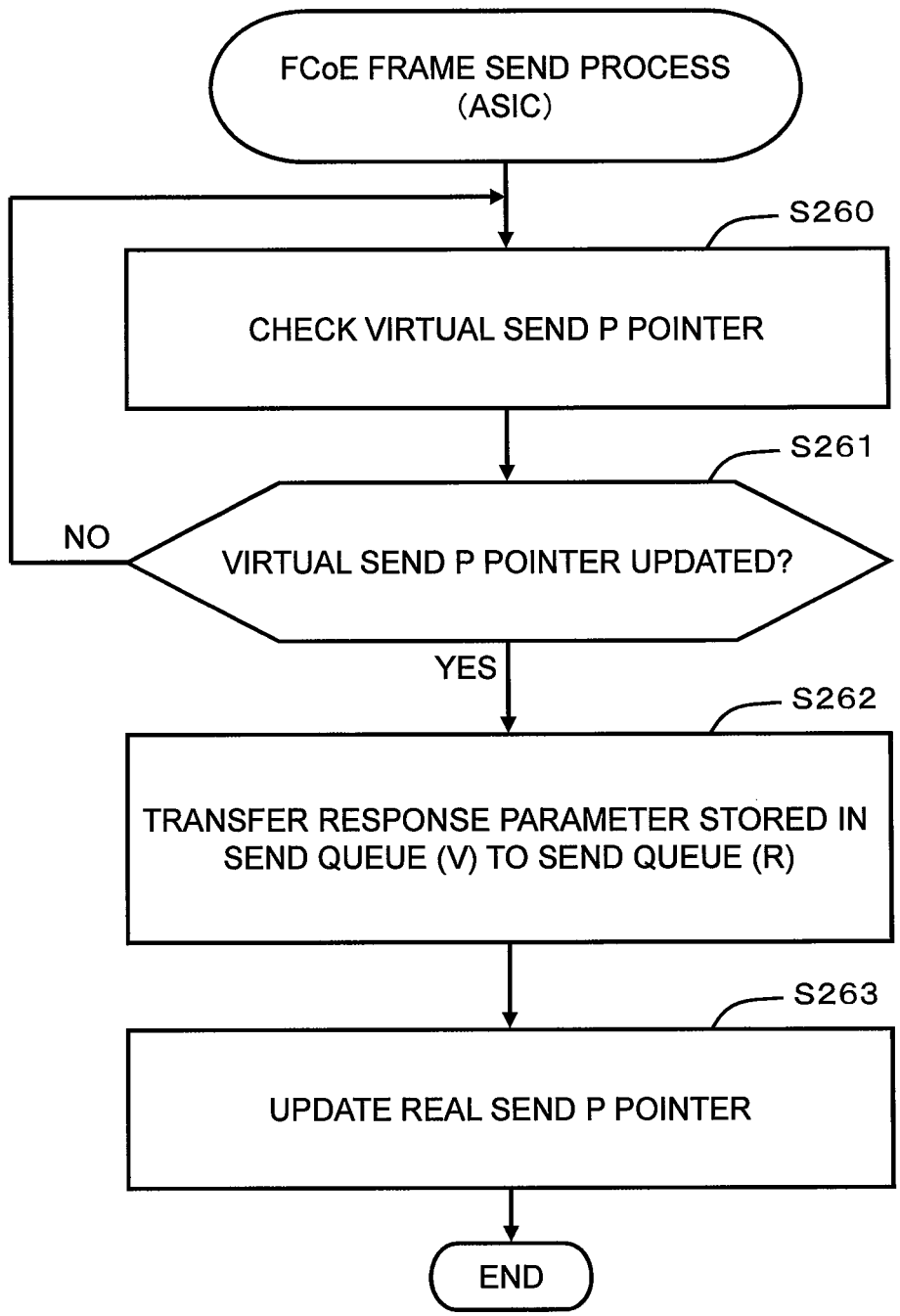
FIG. 24 is a flowchart showing a process in which the communication conversion circuit inside the channel adapter package sends an FCoE frame to a host.

FIG. 24 is a flowchart showing the processing for sending an FCoE frame to the host 20 from the host coupler 111B. This processing is executed in S38 of FIG. 15, and in S87 and S101 of FIG. 17.

The communication conversion circuit 113B checks the virtual send P pointer P9B (S260) and determines whether or not the virtual send P pointer P9B has been updated (S261). In a case where the virtual send P pointer P9B has been updated (S261: YES), the communication conversion circuit 113B transfers the response parameter stored in the virtual send queue Q2B to a predetermined real send queue Q3B and stores same therein (S262). The communication conversion circuit 113B updates the real send P pointer P10 (S263) and ends this processing. In accordance with this, the FCoE protocol chip 112B sends a response to the host 20 from the host coupler 111B based on the response parameter stored in the real send queue Q3B.

Configuring this example like this provides a communication conversion circuit 113 for each communication protocol between the protocol chip 112 and the microprocessor 131, thereby making it possible for the communication conversion circuit 113 to absorb the differences of the different procedures of each communication protocol. Therefore, it is possible to make most of the procedures compatible, and to reduce the number of development processes of the microprocessor 131 and the protocol chip 112.

In addition, in this example, the respective microprocessors 131 are able to communicate with different types of protocol chips 112 in accordance with substantially common procedures. Therefore, the respective microprocessors 131 can be used more efficiently than in a case where a dedicated microprocessor is provided for each communication protocol.

In addition, in this example, since the microprocessor 131 communicates with the protocol chip 112 by way of the communication conversion circuit 113, the processing load of the microprocessor can be alleviated more than in a case where the microprocessor communicates directly with the protocol chip. The microprocessor 131 is able to complete the response process by simply storing a response in a queue of the communication conversion circuit 113.

Example 2

FIG. 25 is a diagram of an entire computer system related to a second example. This example is equivalent to a variation of the first example. This example also supports a communication protocol other than the FC and FCoE as a predetermined communication protocol.

A storage control apparatus 10A comprises multiple types of channel adapter packages 110A through 110G. Since 110A and 110B are the same as those explained hereinabove, explanations thereof will be omitted. The channel adapter package 110C supports iSCSI. The channel adapter package 110D supports SAS. The channel adapter package 110E supports SCSI. The channel adapter package 110F supports InfiniBand. The channel adapter package 110G supports PCI-Express.

Even though this example is configured like this, a communication conversion circuit is provided in each of the channel adapter packages 110A through 110G to convert peculiar procedures that differ in each communication protocol to common procedures. Therefore, the same effect as in the first example is achieved.

Furthermore, the present invention is not limited to the above-described examples. A person having ordinary skill in the art will be able to make various additions and changes without departing from the scope of the present invention.

REFERENCE SIGNS LIST 10, 10A Storage control apparatus
20 Host computer
110 Channel adapter package
120 Disk adapter package
130 Microprocessor package
131 Microprocessor
132 Local memory
140 Cache memory package 111A, 111B Host coupler
112A, 112B Protocol chip
113A, 113B Communication conversion circuit
114A, 114B External memory
116A, 116B Internal memory

The invention claimed is:

1. A storage control apparatus comprising:
at least one first communication control part for communicating with a host apparatus;
at least one storage apparatus for storing data that is used by the host apparatus;
at least one second communication control part for communicating with the storage apparatus; and
at least one microprocessor part, which comprises at least one microprocessor for processing a command received from the host apparatus via the first communication control part and sending a result of this processing to the host apparatus via the first communication control part,
wherein the first communication control part comprises:
at least one host coupling part, which is coupled to the host apparatus;
a protocol control part, which is coupled to the host coupling part, and is used for carrying out communications with the host apparatus in accordance with a predetermined communication protocol; and
a communication conversion part, which is coupled to the protocol control part and the microprocessor part, and which communicates with the protocol control part based on a procedure corresponding to a type of the protocol control part, and communicates with the microprocessor part based on a common procedure regardless of the type of the protocol control part,
wherein, multiple channel adapter packages serving as the first communication control part are provided,
multiple microprocessor packages serving as the microprocessor part are provided,
each of the microprocessor packages comprises:
multiple microprocessors used for processing the command; and
at least one local memory shared by the respective microprocessors,
each of the channel adapter packages comprises:
multiple communication ports serving as the host coupling part;
multiple protocol control circuits serving as the protocol control part;
at least one communication conversion circuit serving as the communication conversion part; and
at least one memory, which is coupled to the communication conversion circuit, and is used by the communication conversion circuit,
the respective channel adapter packages comprise channel adapter packages that use respectively different predetermined communication protocols,
the memory inside each of the channel adapter packages is provided with;
a real receive queue, which is used for storing the command received via the respective host coupling parts, and is prepared in accordance with the number of the host coupling parts;
a real send queue, which is used for storing a response from the respective microprocessor packages, and is prepared for each of the host coupling parts; and
a channel-side virtual send queue, which is used, for storing the response parameter prior to the response parameter being stored in any of the real send queues, and is prepared for each of the communication ports in accordance with the number of the microprocessors,
the local memory inside each of the microprocessor packages comprises:
a virtual receive queue, which is used for storing the command transferred from the real received queue, and is prepared for each of the microprocessors inside the microprocessor package in accordance with the number of the communication ports;
a microprocessor-side virtual send queue, is used for storing, the response denoting a processing result of the command executed by any of the microprocessors, and is prepared for each of the microprocessors inside the microprocessor package in accordance with the number of the communication ports,
wherein the command from the host apparatus is received by the protocol control circuit inside a predetermined channel adapter package from amnog the channel adapter packages in accordance with the predetermined communication protocol,
the protocol control circuit stores the received command in the real receive queue, and also uses a method corresponding to the predetermined communication protocol to notify the communication conversion circuit of the fact that the command has been stored in the real receive queue,
the communication conversion circuit, based on an address and an access-destination volume of the command, selects, from among the microprocessors inside the microprocessor packages, one microprocessor that is associated with the address and the access-destination volume,
the communication conversion circuit transfers the command stored in the real receive queue to the virtual receive queue that is associated with the selected microprocessor,
the selected microprocessor, upon learning that the command has been stored in the virtual receive queue, executes processing in accordance with this command,
the selected microprocessor creates the response denoting the processing results of the command, and stores this response in the virtual send queue,
the selected microprocessor transfers the response to the channel-side virtual send queue,
upon learning that the response has been stored in the channel-side virtual send queue, the communication conversion circuit selects, from among the real send queues, one real send queue that is associated with the microprocessor that has created the response,
the communication conversion circuit transfers the response, which has been stored in the channel-side virtual send queue, to the selected real send queue and stores same therein, and
the protocol control circuit sends the response to the host apparatus via the host coupling part corresponding to the reel send queue in which the response has been stored.

2. A storage control apparatus according to claim 1,
wherein, the first communication control part comprises multiple first communication control parts that use respectively different predetermined communication protocols,
the host apparatus comprises multiple host apparatuses that use the respective predetermined communication protocols,
the communication conversion parts of the first communication control parts respectively communicate with the corresponding host apparatuses in accordance with the respectively different predetermined communication protocols, and the communication conversion parts of the first communication control parts respectively communicate with the microprocessor part in accordance with the same common procedure.

3. A storage control apparatus according to claim 2, wherein, the microprocessor part comprises multiple microprocessor parts, each of the microprocessor parts comprises multiple microprocessors, in a case where the command is received, the communication conversion part of each of the first communication control parts selects, from among the microprocessors of the microprocessor parts and based on an address and an access-destination volume of the command, one microprocessor that is associated with the address and the access-destination volume, and sends the command to this selected microprocessor.

4. A storage control apparatus according to claim 3, wherein, the communication conversion part of each of the first communication control parts comprises, for each of the host coupling parts, a real receive queue for storing the command that is received from the host apparatus, the microprocessor part comprises, for each of the microprocessors and in accordance with the number of the host coupling parts, a virtual receive queue for storing the command that is transferred from the communication conversion part, and the communication conversion part of each of the first communication control parts, upon receiving the command, transfers the command to the virtual receive queue corresponding to the selected microprocessor and stores same therein, and notifies the selected microprocessor of the fact that the command has been stored in the virtual receive queue.

5. A storage control apparatus according to claim 4, wherein, each of the microprocessor parts comprises, for each of the microprocessors and in accordance with the number of the host coupling parts, a microprocessor-side virtual send queue for storing a response denoting the processing result of the command in the respective microprocessors, the communication conversion part of each of the first communication control parts comprises a channel-side virtual send queue corresponding to each of the microprocessor-side virtual send queues of the respective microprocessor parts, and the microprocessor, which has processed the command from among the microprocessors, transfers the response to the channel-side virtual send queue via the microprocessor-side virtual send queue.

6. A storage control apparatus according to claim 5, wherein, from among the microprocessors, a microprocessor that has processed a command related to a first predetermined communication protocol ends the processing of the command by transferring the response of the command to the channel-side virtual send queue via the microprocessor-side virtual send queue, and from among the microprocessors, a microprocessor that has processed a command related to a second predetermined communication protocol ends the processing of the command by transferring the response of the command to the channel-side virtual send queue via the microprocessor-side virtual send queue, and notifying the communication conversion part of the fact that the response has been stored in the channel-side virtual send queue.

7. A storage control apparatus according to claim 5, wherein, upon learning that the response has been stored in the channel-side virtual send queue, the communication conversion part selects, from among multiple real send queues provided corresponding to the respective host parts, one real send queue that is associated with the microprocessor that has created the response, the communication conversion part transfers the response, which has been stored in the channel-side virtual send queue, to the selected real send queue and stores same therein, and the protocol control part sends the response to the host apparatus via a host coupling part corresponding to the real send queue in which the response has been stored.

8. A storage control apparatus according to claim 3, wherein, in a case where the command is received, the communication conversion part of each of the first communication control parts selects, from among the microprocessors of the microprocessor parts, one microprocessor with a load that is smaller than a predetermined value, and sends the command to the selected microprocessor.

9. A method for controlling an operation of a storage control apparatus, the storage control apparatus comprising:

multiple first communication control parts for communicating with a host apparatus;

at least one storage apparatus for storing data that is used by the host apparatus;

at least one second communication control part for communicating with the storage apparatus; and multiple microprocessor parts, which comprise multiple microprocessors for processing a command received from the host apparatus via any first communication control part from among the first communication control parts, and sending a result of this processing to the host apparatus via the first communication control part, and the first communication control part comprising:

at least one host coupling part, which is coupled to the host apparatus;

a protocol control part, which is coupled to the host coupling part, and is used for carrying out communications with the host apparatus in accordance with a predetermined communication protocol; and a communication conversion part, which is coupled to the protocol control part and the microprocessor parts, and which communicates with the protocol control part based on the predetermined communication protocol, and communicates with the microprocessor parts based on a preset common procedure, wherein the communication conversion part, upon receiving the command, selects one microprocessor from among the microprocessors of the microprocessor parts, and sends the command to this selected microprocessor;

the microprocessor, which has processed the command from among the microprocessors, creates a response denoting a processing result of the command, and transfers the response to the communication conversion part that has sent the command; and the communication conversion part sends the response to the host apparatus from the host coupling part, wherein, multiple channel adapter packages serving as the first communication control part are provided;

multiple microprocessor packages serving as the microprocessor part are provided, each of the microprocessor packages comprises:

multiple microprocessors used for processing the command; and at least one local memory shared by the respective microprocessors, each of the channel adapter packages comprises:

multiple communication ports serving as the host coupling part;

multiple protocol control circuits serving as the protocol control part;

at least one communication conversion circuit serving as the communication conversion part; and at least one memory, which is coupled to the communication conversion circuit, and is used by the communication conversion circuit, the respective channel adapter packages comprise channel adapter packages that use respectively different predetermined communication protocols, the memory inside each of the channel adapter packages is provided with;

a real receive queue, which is used for storing the command received via the respective host coupling parts, and is prepared in accordance with the number of the host coupling parts;

a real send queue, which is used for storing a response from the respective microprocessor packages, and is prepared for each of the host coupling parts; and a channel-side virtual send queue, which is used, for storing the response parameter prior to the response parameter being stored in any of the real send queues, and is prepared for each of the communication ports in accordance with the number of the microprocessors, the local memory inside each of the microprocessor packages comprises:

a virtual receive queue, which is used for storing the command transferred from the real received queue, and is prepared for each of the microprocessors inside the microprocessor package in accordance with the number of the communication ports; and a microprocessor-side virtual send queue, which is used for storing the response denoting a processing result of the command executed by any of the microprocessors, and is prepared for each of the microprocessors inside the microprocessor package in accordance with the number of communication ports, receiving, by the protocol control circuit inside a predetermined channel adapter package from among the channel adapter packages in accordance with the predetermined communication protocol, the command from the host apparatus, storing, by the protocol control circuit, the received command in the real receive queue, and also using a method corresponding to the predetermined communication protocol to notify the communication conversion circuit of the fact that the command has been stored in the real receive queue, selecting, by the communication conversion circuit, based on an address and an access-destination volume of the command, from among, the microprocessors inside the microprocessor packages, one microprocessor that is associated with the address and the access-destination volume, transferring, by the communication conversion circuit, the command stored in the real receive queue to the virtual receive queue that is associated with the selected microprocessor, executing, by the selected microprocessor, upon learning that she command has been scored in the virtual receive queue, processing in accordance, with this command, creating, by the selected microprocessor, the response denoting the processing result of the command, and storing this response in the virtual send queue, transferring, by the selected microprocessor, the response to the channel-side virtual send queue, selecting, by the communication conversion circuit, upon learning that the response has been stored in the channel-side virtual send queue, from among the real send queues, one real send queue that is associated with the microprocessor that has created the response, transferring, by the communication conversion circuit, the response, which has been stored in the channel-side virtual send queue, to the selected real send queue and stores same therein, and sending, by the protocol control circuit, the response to the host apparatus via the host coupling part corresponding to the real send queue in which the response has been stored.

\* \* \* \* \*